United States Patent [19]
Matyas, Jr. et al.

[11] Patent Number: 4,850,017
[45] Date of Patent: Jul. 18, 1989

[54] CONTROLLED USE OF CRYPTOGRAPHIC KEYS VIA GENERATING STATION ESTABLISHED CONTROL VALUES

[75] Inventors: Stephen M. Matyas, Jr., Manassas, Va.; Carl H. W. Meyer, Kingston, N.Y.; Bruno O. Brachtl, Boeblingen, Fed. Rep. of Germany

[73] Assignee: International Business Machines Corp., Armonk, N.Y.

[21] Appl. No.: 55,502

[22] Filed: May 29, 1987

[51] Int. Cl.$^4$ .............................................. H04L 9/04
[52] U.S. Cl. ....................................... 380/21; 380/25; 380/45; 380/47
[58] Field of Search ........................ 380/21, 25, 45, 47

[56] References Cited

U.S. PATENT DOCUMENTS

| | | | |
|---|---|---|---|
| 4,218,738 | 8/1980 | Matyas et al. | 380/25 |
| 4,223,403 | 9/1980 | Kinheim et al. | 380/25 |
| 4,227,253 | 10/1980 | Ehrsam et al. | 380/25 |
| 4,386,233 | 8/1983 | Smid et al. | 380/25 |
| 4,500,750 | 2/1985 | Elander | 380/25 |
| 4,503,287 | 3/1985 | Morris et al. | 380/45 |
| 4,578,530 | 3/1986 | Zeidler | 380/24 |
| 4,683,968 | 8/1987 | Applebaum et al. | 380/45 |
| 4,723,283 | 2/1988 | Nasagawa et al. | 380/23 |
| 4,723,284 | 2/1988 | Munek et al. | 380/23 |

*Primary Examiner*—Salvatore Cangialosi
*Attorney, Agent, or Firm*—C. Lamont Whitham; Michael E. Whitham

[57] ABSTRACT

A method for controlling the use of a cryptographic key at a using station by a generating station in a network of generating and using stations is disclosed. A control value specifying the use of the cryptographic key is transmitted with a generated cryptographic key to at least two designated using stations one of which may be the generating station. Each of the generating and using stations have cryptographic facilities that securely store a master key. Two techniques are described for controlling the use of the cryptographic key. In the first, the key and the control value are authenticated via a special authentication code before use by the using station. In the second, the key and control value are coupled during key generation such that the key is recovered only if a correct control value is specified. In addition, two techniques are described for controlling who may use the cryptographic key. In the first, each using station has a unique secret transport key shared with the generating station which generates the key in such a way that it can be recovered or regenerated only by the designated using station possessing the correct secret transport key. In the second, secret transport keys are shared by pairs of using stations and cryptographic separation is achieved by using public or nonsecret values unique to each using station.

22 Claims, 22 Drawing Sheets

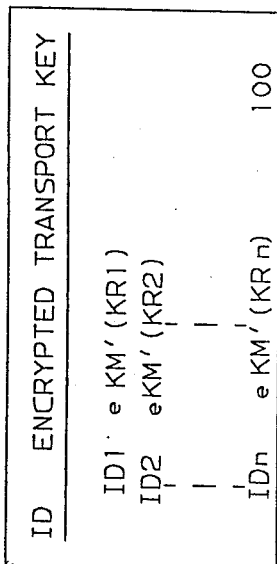
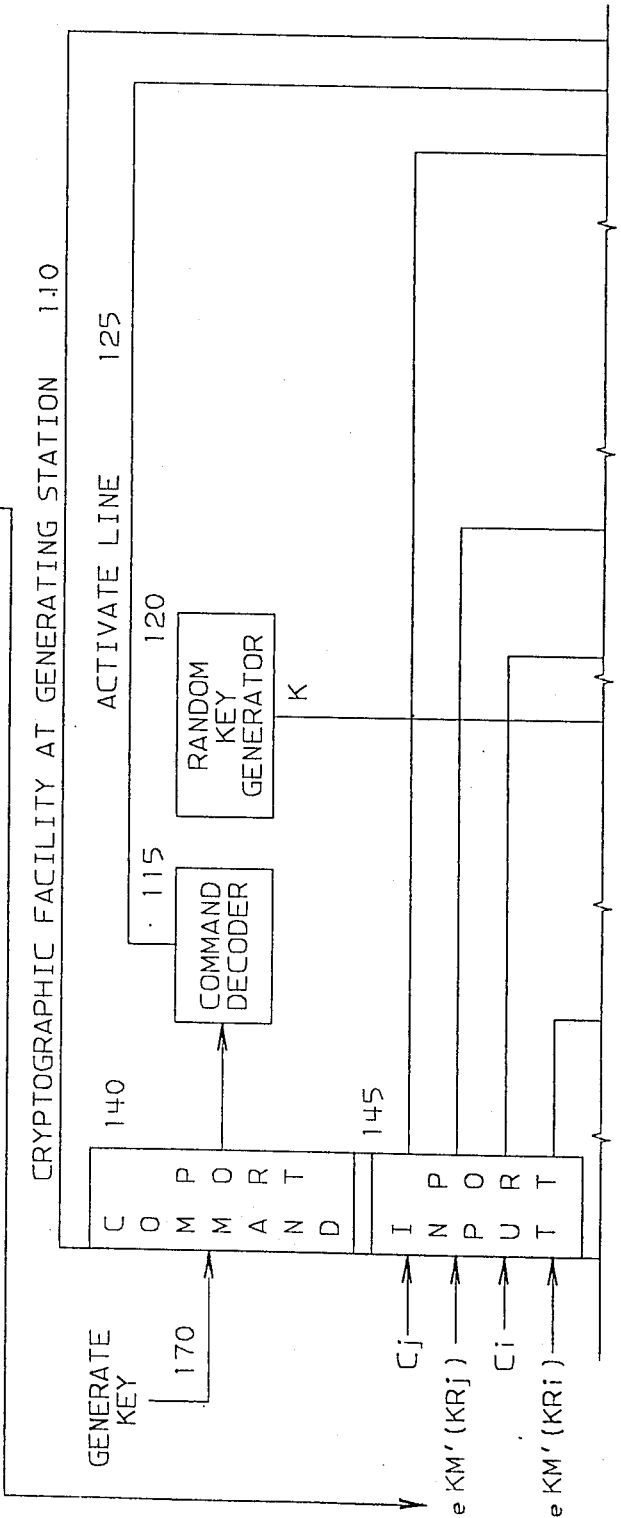
FIG. 10A
ID$i$ OF KEY SHARED BETWEEN GENERATING STATION AND USING STATION $i$;
AND ID$j$ OF KEY SHARED BETWEEN GENERATING STATION AND USING STATION $j$ FIG. 11  EXAMPLE OF FUNCTION f1
INPUTS:  KR   K
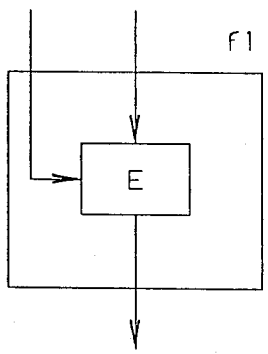
OUTPUT:  eKR(K) = f1(KR,K)
FIG. 12  EXAMPLE OF FUNCTION f2
INPUTS:   K    C
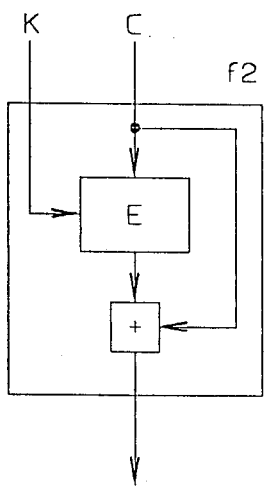
OUTPUT:   eK(C) +C=f2(K,C)

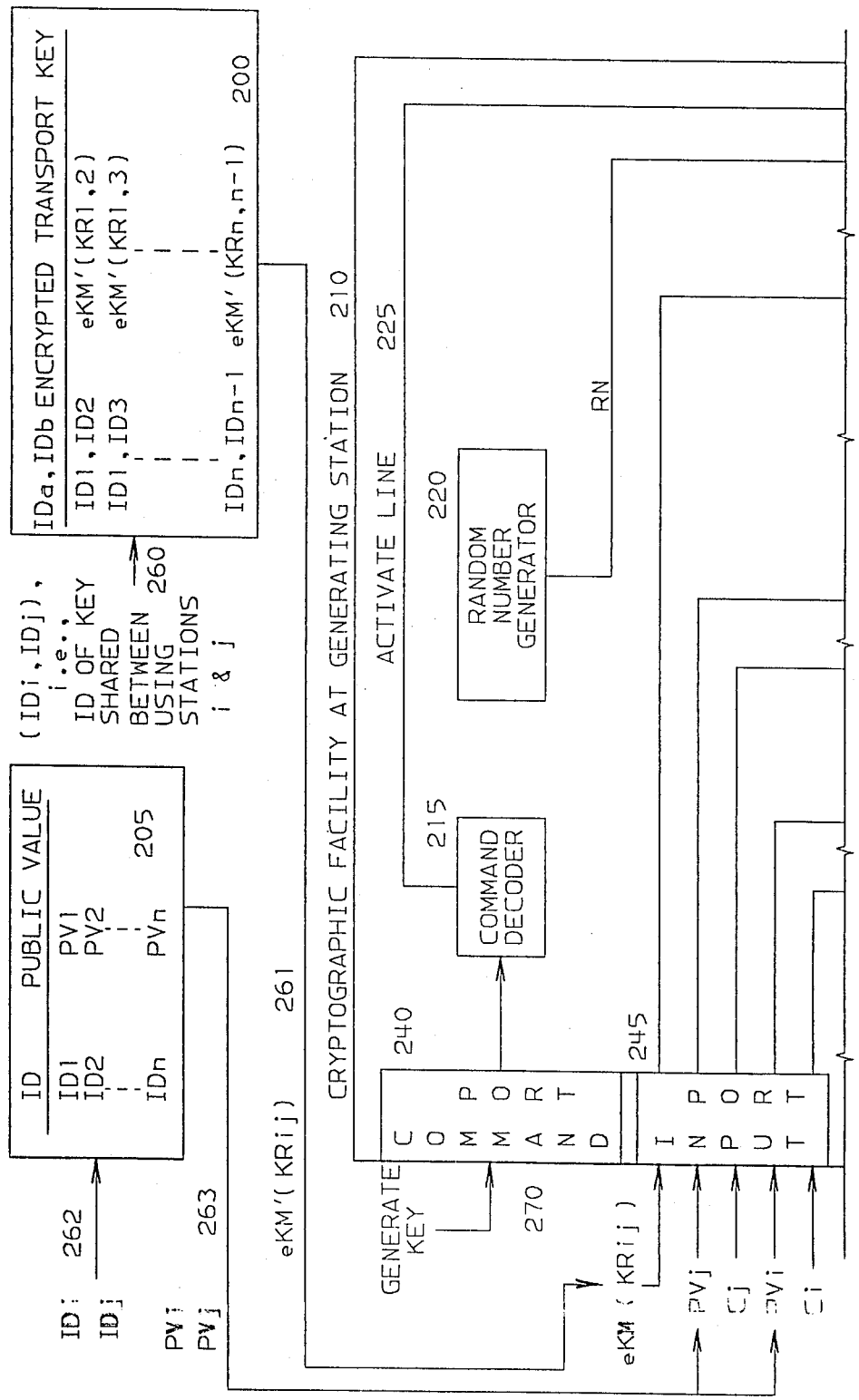

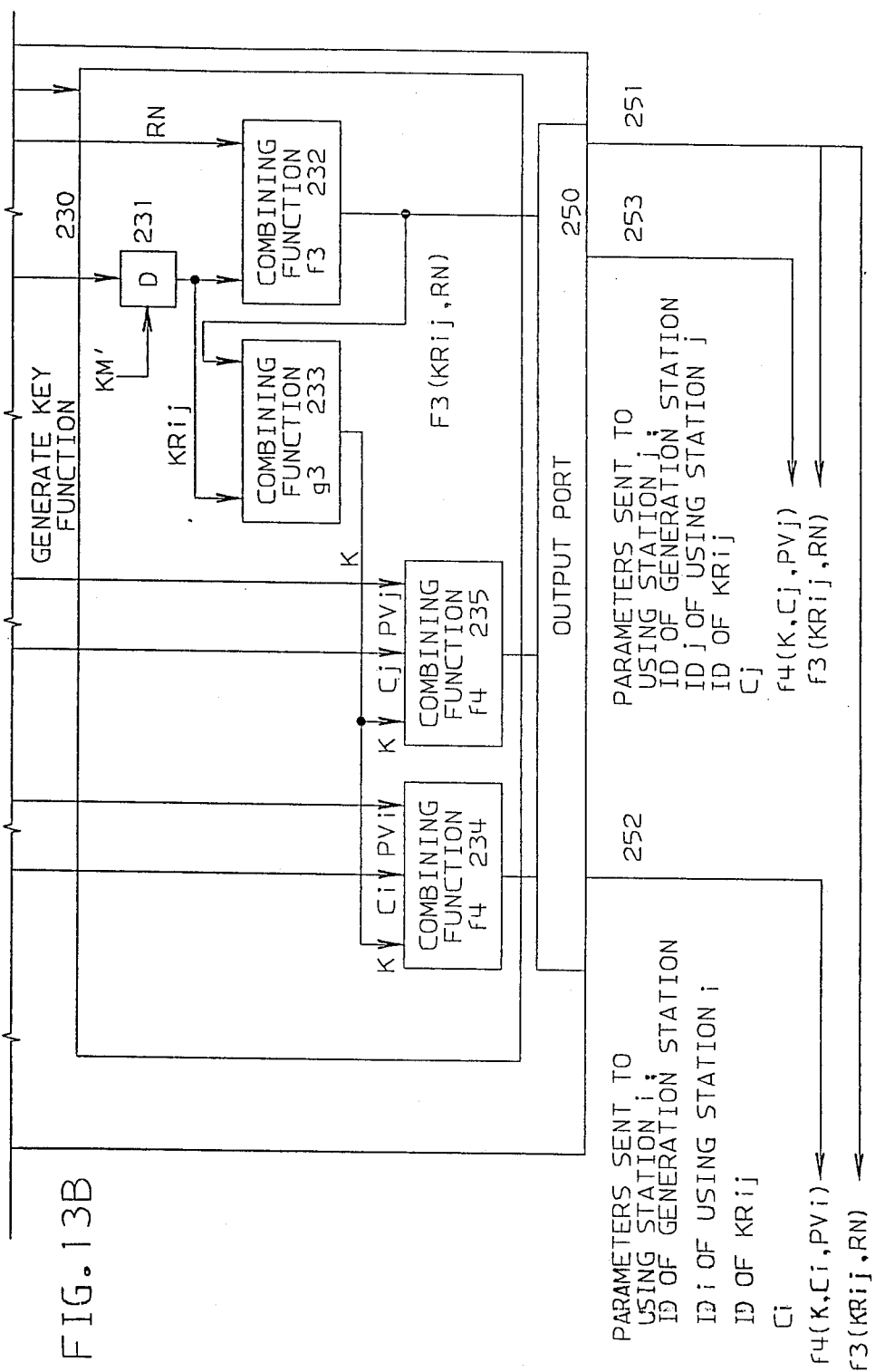

FIG. 14  EXAMPLE OF FUNCTIONS f3 & g3
INPUTS: KR    RN              INPUTS: KR    RN=f3(KR,RN)
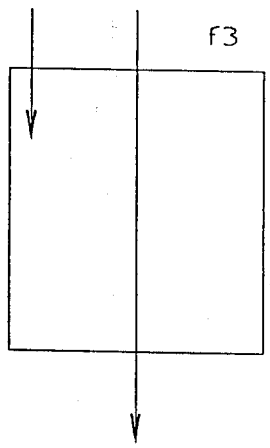
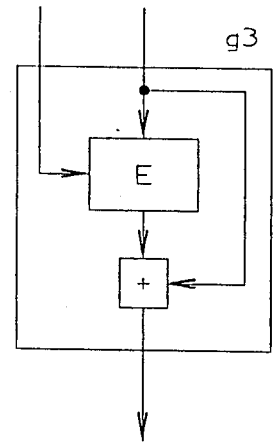
OUTPUT:   RN=f3(KR,RN)        OUTPUT:  eKR(RN) +RN=g3(KR,RN)
FIG. 15  EXAMPLE OF FUNCTIONS f3 & g3
INPUTS:  KR    RN       INPUTS:  KR    eKR(RN)=f3(KR,RN)
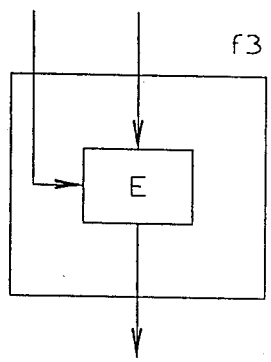
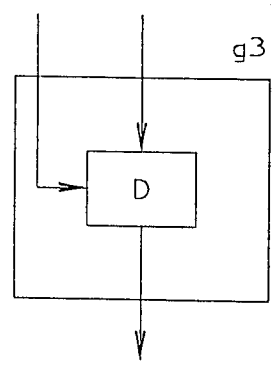
OUTPUT: eKR(RN)=f3(KR,RN)    OUTPUT:  RN=g3(KR,RN)=K FIG. 16 EXAMPLE OF FUNCTION f4
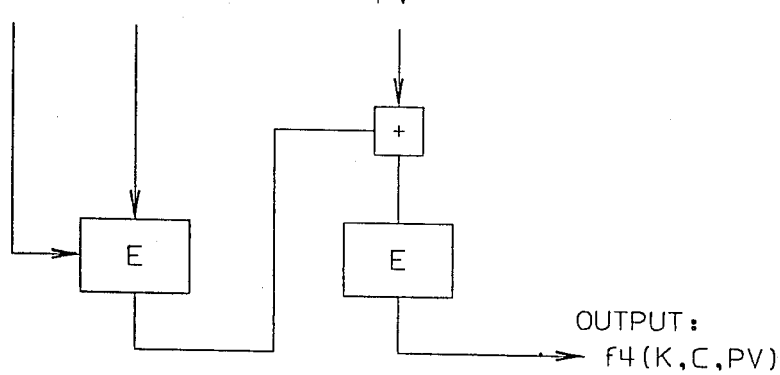
FIG. 17 EXAMPLE OF FUNCTION f4
KI IS A CONSTANT NONSECRET KEY USED
BY THE ALGORITHM

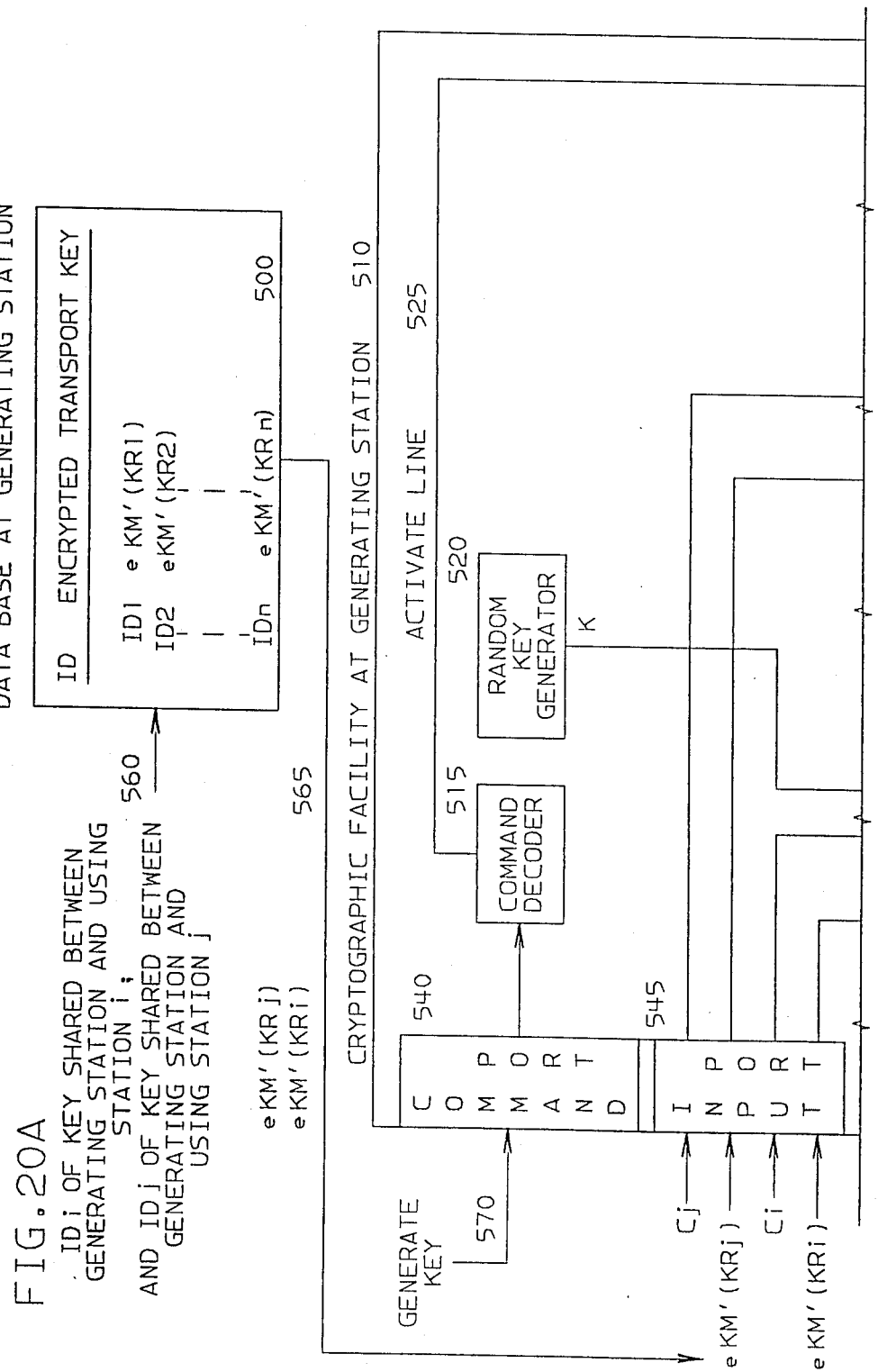

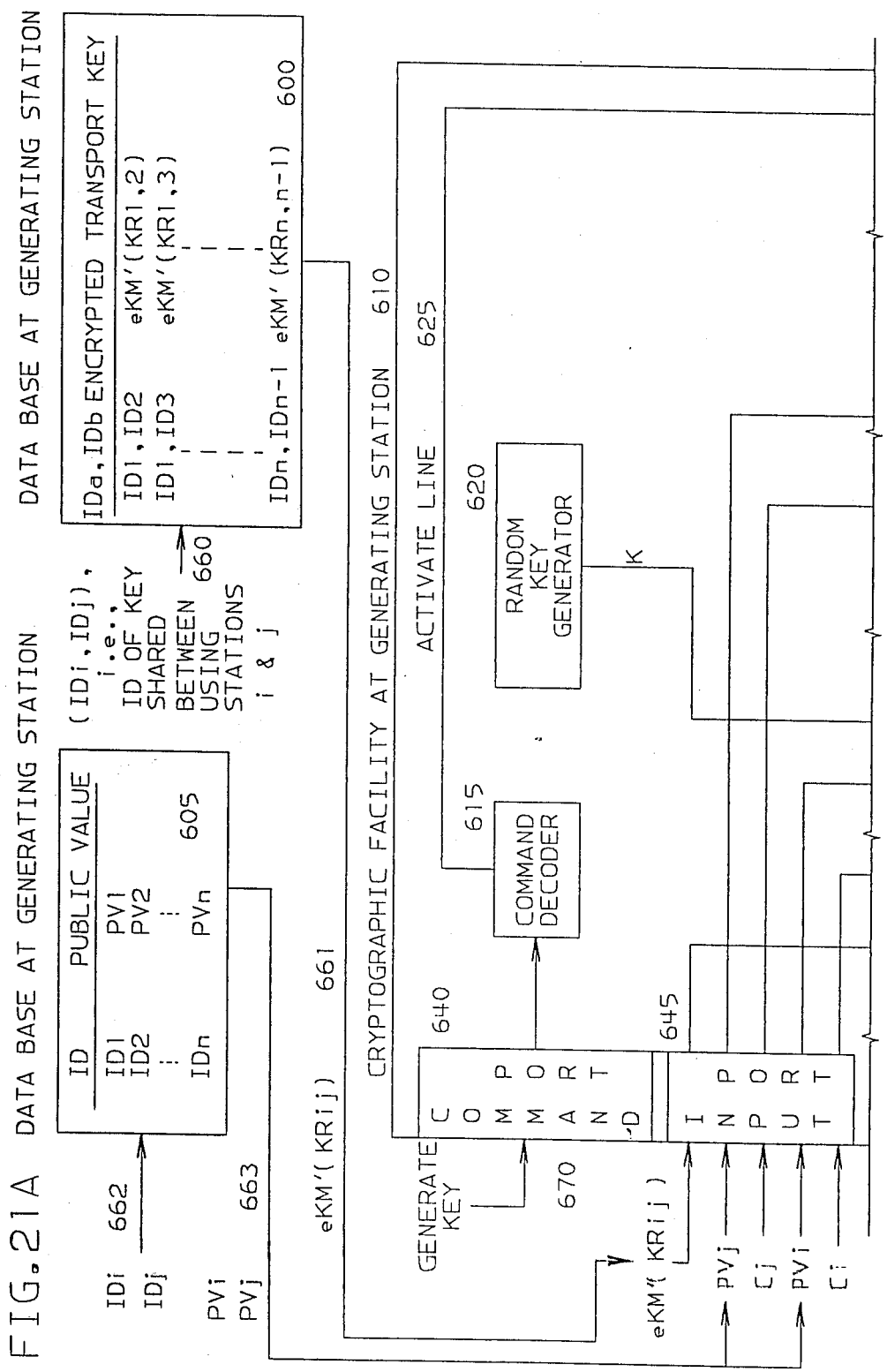

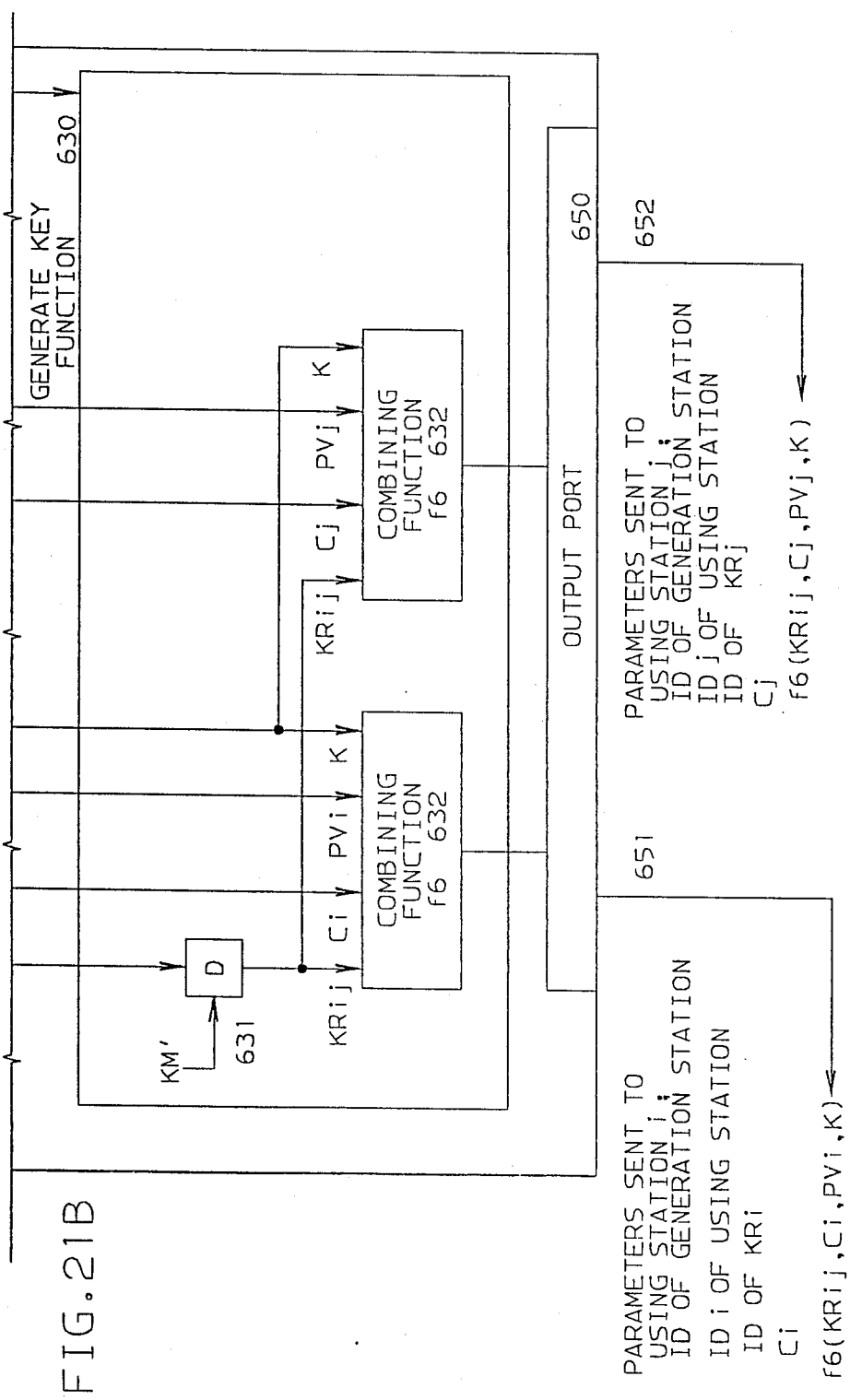

FIG. 22  EXAMPLES OF FUNCTIONS f5 & g5
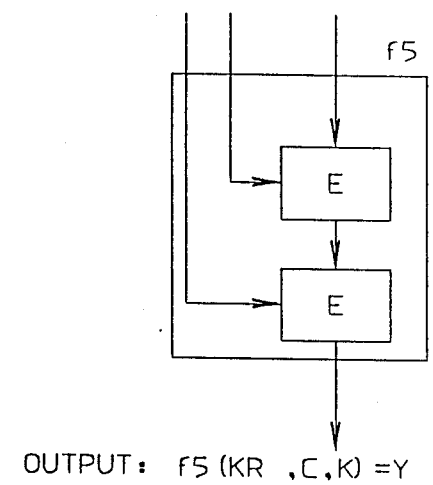
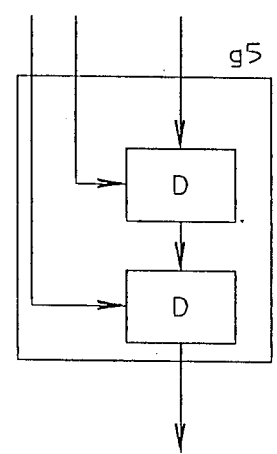
FIG. 23  EXAMPLES OF FUNCTIONS f6 & g6
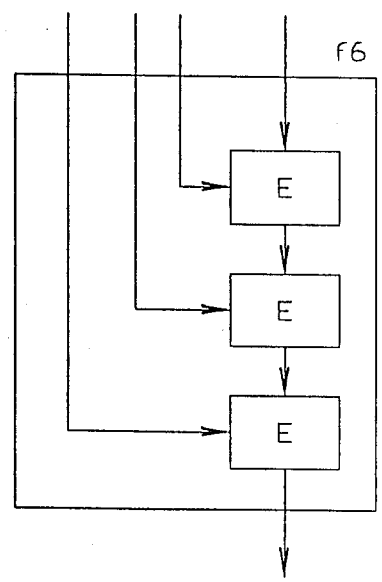
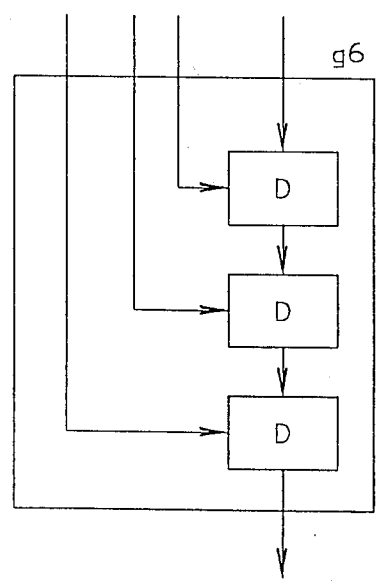

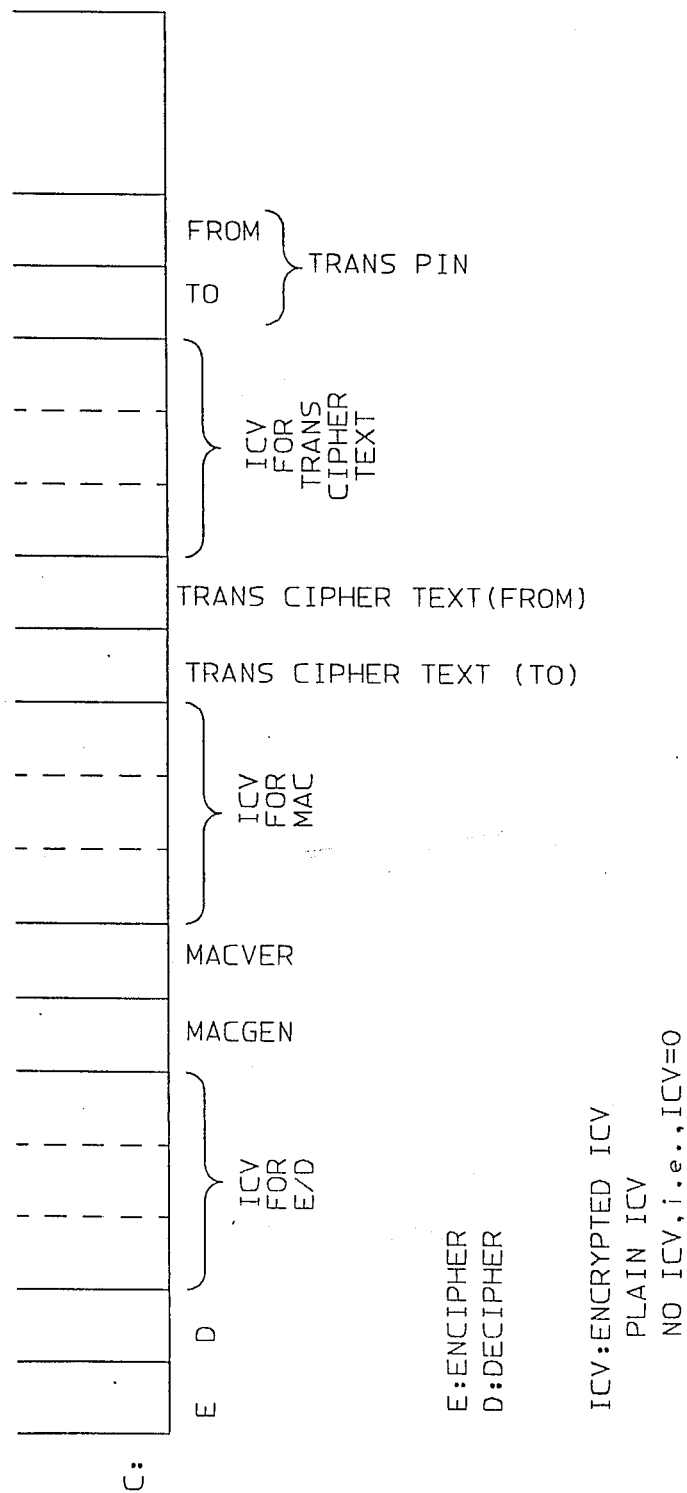

CONTROLLED USE OF CRYPTOGRAPHIC KEYS VIA GENERATING STATION ESTABLISHED CONTROL VALUES

DESCRIPTION

BACKGROUND OF THE INVENTION

1. Field of the Invention

The present invention generally relates to a message transmission systems and, more particularly, to a system for secure generation and transmission of cryptographic keys from a generating station to one or more using stations where the use of the cryptographic key at each using station is controlled via a control value established by the generating station. Under the protocol according to the invention, a generating station may also be a using station.

2. Description of the Prior Art

Cryptography is the only known practical means for protecting information transmitted through a large communications network, be it telephone line, microwave, or satellite. A detailed discussion of how cryptography can be used to achieve communications security is provided in the book by Carl H. Meyer and Stephen M. Matyas entitled *Cryptography: A New Dimension in Computer Data Security*, John Wiley & Sons (1982). Cryptography can also be used to achieve file security, and a protocol is developed in the Meyer and Matyas book for the encryption of data stored in removable media. Other subjects discussed in the book are enhanced authentication protocols, including personal verification, message authentication, and digital signatures. These subjects are of particular interest to those concerned with electronic funds transfer and credit card applications within the banking and finance industry, or any other area where the originator, timeliness, contents, and intended receiver of a message must be verified.

In the prior art, several references respectively illustrate protocols for distributing cryptographic keys among cryptographically communicating nodes. Further, they discuss authentication as a process independent of the establishment of session keys. These references include U.S. Pat. No. 4,227,253 to Ehrsam et al. entitled "Cryptographic Communication Security for Multiple Domain Networks" issued Oct. 7, 1980, and U.S. Pat. No. 4,218,738 to Matyas et al. entitled "Method for Authenticating the Identity of a User of an Information System" issued Aug. 19, 1980. The Matyas et al. patent involves a node sending a pattern to a terminal requiring the terminal to modify the pattern and remit its modification back to the host to permit a comparison match.

Ehrsam et al., U.S. Pat. No. 4,227,253, describe a communication security system providing for the establishment of a session key and the concept of cross-domain keys. The Ehrsam et al. patent typifies a mechanism, i.e., the use of cross-domain keys, used for exchanging session key information between nodes on the one hand and protecting the secrecy of the node master keys on the other hand. More specifically, Ehrsam et al. descibe a cryptographic facility at a host computer which, among other things, has a master key KM0 with first and second variants of the master key, denoted KM1 and KM2, and cryptographic operations in support of cryptographic applications and key management, denoted ECPH, DCPH, RFMK, and RTMK. Variants of the master key are obtained by inverting designated bits in the master key to produce different keys, which is just equivalent to Exclusive-ORing predetermined mask values with the master key to produce the variant master keys. The neumonics ECPH, DCPH, RFMK, and RTMK represent the cryptographic operations for Encipher Data, Decipher Data, Reencipher From Master Key, and Reencipher To Master Key. A precise definition of these cryptographic operations is unimportant to the present disclosure; however, the method is such that keys encrypted under KM0 can be used beneficially with the ECPH and DCPH functions, keys encrypted under KM1 can be used with the RFMK function, and keys encrypted under KM2 can be used with the RTMK function, but not vice versa. If V0, V1 and V2 denote the mask values which when Exclusive-ORed with KM produce KM0, KM1 and KM2, respectively, then there is an implicit control by the mask values of which encryptographic keys may be beneficially used by which of these cryptographic functions. Although Ehrsam et al. uses variants to control the use of cryptographic keys, by coupling the variants to the cryptographic operations, there is a one-to-one equivalence between the cryptographic operations and the prescribed variants of the key parameters allowed with each cryptographic operation. The Ehrsam et al. architecture does not allow different combinations of variants of keys to be used with each cryptographic function. Thus, for example, if ECPH and DCPH are supported and it is desired to implement data keys with properties of Encipher Only, Decipher Only, and Encipher/Decipher using variants V1, V2 and V3, there is no way to assign these variants to the ECPH and DCPH operations to implement the desired data key properties; i.e., there are not enough variants defined for these operations to accomplish the purpose. In effect, to design such a system requires an ECPH1 which operates with V1, an ECPH2 which operates with V3, a DCPH1 which operates with V2, and a DCPH2 which operates with V4. Therefore, the use of variants to control the use of a cryptographic key in a sophisticated architecture would require the function set to be expanded, and this expansion in the function set has disadvantages the most important of which are the increase of system complexity and cost.

U.S. Pat. No. 4,386,233 to Smid et al. entitled "Cryptographic Key Notarization Methods and Apparatus" issued May 31, 1983, describes a technique of notarizing cryptographic keys for a cryptographic function by encrypting the keys with the cryptographic function using a notarizing cryptographic key derived from identifier designations associated with the encryptor and intended decryptor, respectively, and an interchange key which is accessible only to authorized users of the cryptographic function. In other words, Smid et al. control who can use a key but not how the key can be used. Smid et al.'s notarizing key is derived by concatenating the binary equivalent of the encryptor's identifier designation with the binary equivalent of the decryptor's identifier designation as an ordered pair and logically combining in an Exclusive-OR operation the concatenated result with the interchange key.

U.S. Pat. No. 4,503,287 to Morris et al. entitled "Two-Tiered Communication Security Employing Asymmetric Session Keys" issued Mar. 5, 1985, describes a technique for ensuring communications security between a host computer and another remote computer or terminal by means of a two-tiered cryptographic communications security device and procedure. The Morris et al. technique employs two session keys, one which is encrypted under a master key and transmitted from a remote facility to the host where it is stored, and one which is generated at the host, encrypted under the master key and transmitted to the remote facility where it is used as a session decryptor key.

Thus, while the prior art provides various protocols for distributing cryptographic keys among cryptographically communicating nodes and even provides a way of controlling who may use a cryptographic key at a particular node, there has not been a practical and effective solution to the problem of how to control the use of a cryptographic key at a node, particularly in a sophisticated system. Frequently, different types of keys must be distributed to certain system nodes.

SUMMARY OF THE INVENTION

It is therefore an object of the present invention to provide a technique for the electronic transmission of keys in such a way that cryptographic key management operations at a receiving node are controlled by the sending node.

It is a further object of the invention to provide a technique that reduces the possibility of the misuse of keys at a receiving using station.

It is another object of the invention to provide a cryptographic technique wherein a generating station in a communications network controls which using stations may use a distributed cryptographic key while at the same time controlling how the cyrptographic key may be used at the using stations in the network.

The cryptographic techniques according to the present invention are practiced in a communications network having a plurality of stations, each of which has a cryptographic facility which performs cryptographic operations in support of the network encryption function. Such a network can be, for example, an electronic funds transfer (EFT) or point of sale (POS) network and, in any case, would include at least one generating station and at least two using stations. The cryptographic facility at each station in the network has a Key Generation Function (KGF) and a Key Usage Function (KUF). Each key generated by a KGF has an associated control value C which prescribes how the key may be used, and the KUF provides a key authorization function to ensure that a requested usage of a key complies with the control value C.

Two methods may be employed to implement the technique whereby a generating station in a communications network controls the use of a cryptographic key. In the first method, each key and control value are authenticated via a special authentication code before use. In the second method, the key and the control value are coupled during key generation such that the key is recovered only if the correct control value is specified.

In addition to controlling the use of a cryptographic key, the generating station controls which generating stations may use a generated and distributed cryptographic key. Two methods are employed to additionally control who may use a cryptographic key. In the first method, each using station has a unique secret transport key shared with the generating station, which the generating station uses to distribute generated data keys to the using stations. Keys are generated by the generating station in such a way that they can be recovered or regenerated only by the designated using stations possessing the correct, designated, secret transport keys. In the second method, each using station has a unique nonsecret value associated with it and each pair of using stations share a common, secret transport key with each other and also with the generating station. Keys are generated by the generating station such that they are recovered or regenerated only by the designated using stations possessing the correct, designated, secret transport keys. However, since the transport key is shared among two using stations, further cryptographic separation is achieved by using the mentioned public values associated with each using station. Thus, the key generation and recovery procedure is such that the keys distributed to each using station can be recovered or regenerated only by the appropriate using stations possessing the correct, designated, public values. In effect, the transport key ensures that keys prepared for using stations i and j cannot be recovered or regenerated at some other using station k, whereas the public values ensure that a key prepared for using station i cannot be recovered or regenerated at using station j, or vice versa.

In summary, four specific cases are described. In the first case, key authentication is used and cryptographic separation is achieved via different, secret transport keys. In the second case, key authentication is used and cryptographic separation is achieved via different public values associated with each using station and via a common, secret transport key. In the third case, no authentication key is used and cryptographic separation is achieved via different, secret transport keys. In the fourth case, no key authentication is used and cryptographic separation is achieved via different public values associated with each using station and via a common, secret transport key.

A control value specifying the usage of a key can be implemented with integrity in three ways:

1. Via authentication codes. The key and control value are distributed separately but are coupled via the authentication code.

2. Via a key distribution function that combines the key with the control value and a secret transport key. Separation is achieved by using different secret transport keys for different using stations.

3. Via a key distribution function that combines the key with the control value, a unique public value associated with the receiving station, and a secret transport key. The transport key is the same for each receiving using station. Separation is achieved via the public value, which is different for each different receiving using station.

The present invention is based on the recognition that additional security benefits could be achieved via a key distribution method where each key had an associated control value that governed how the key would be used by a using station. The invention provides a way to couple the key and the control value in a cryptographically secure way to provide a convenient, easy and flexible method of implementing the concept so that keys can be generated at a generating station and distributed to two or more using stations where they can be used in cryptographic operations for cryptographic processing purposes.

In the case of the present invention, an authentication code is calculated using a secret key which is part of the data being authenticated. This distinguishes the invention from the prior art where the message authentication key and the data being authenticated are decoupled. With message authentication, the secret key is used repeatedly to authenticate messages sent from one party to another who share the authentication key, whereas the secret key, as used in this invention, is used just once to authenticate the key itself, the control value, and possibly other nonsecret data associated with the key.

Ehrsam et al., cited above, provide cryptographic separation via two different cross domain keys (or transport keys) for the purpose of distributing a secret dynamically generated key to two using stations. As mentioned above, the variants employed by Ehrsam et al. provide an implicit control of the beneficial use to which cryptographic keys may be applied; however, the use of variants severely limit the functions which may be supported. The method according to the present invention of using control values to control the use of cryptographic keys avoids the problems associated with variants since each bit in the control value can be associated with a different cryptographic operation. Thus, if there are 32 cryptographic operations, then a control value of 32 bits or less will cover all possible combinations, whereas with variants this would require potentially $2^{32}$ different cryptographic operations to allow for all combinations. The invention achieves an obvious economy of scale with the control value over the Ehrsam et al. method based on variants.

Combining a key and a key variant mask with a secret transport key is a concept described, for example, in copending U.S. Application Ser. No. 722,091 filed Apr. 11, 1985, by Walter Ernst Bass et al. for "A Method for Establishing User Authentication with Composite Session Keys Among Cryptographically Communicating Nodes". In that application, the variant of a single cross domain key is used to achieve unidirectionality between two receiving stations, so that replay attacks are thwarted. The unidirectionality feature precludes attacks where certain quantities sent from one point to another as part of establishing a session key cannot beneficially be replayed back to the originating point. The variant mask associated with the cross domain key, in this case, is not a control value as used in this invention; i.e., it does not specify the usage of the key.

The use of a key distribution function as described in the patent to Smid et al., cited above, describes combining a key to be distributed with the IDs of the sending and receiving nodes and with a secret interchange key. This controls who can use a cryptographic key but does not control how the cryptographic key is to be used. The control value which is used in the present invention, while similar to the concatenation of the sending and receiving IDs as used by Smid et al., is for a wholly different purpose.

BRIEF DESCRIPTION OF THE DRAWINGS

The foregoing and other objects, aspects and other advantages of the invention will be better understood from the following detailed description of a preferred embodiment of the invention with reference to the drawings, in which:

FIGS. 10A and 10B, taken together, are a block diagram of a first embodiment of a generating station wherein a first and second form of a key K are generated via a first function f1 and a first and second key authentication code are generated via a second function f2;

FIG. 11 is a block diagram showing one example of an embodiment for function f1;

FIG. 12 is a block diagram showing one example of an embodiment for function f2;

FIGS 13A and 13B, taken together, are a block diagram showing a second embodiment of a generating station wherein a first and second form of a key K are generated via a third function f3 and a first and second key authentication code are generated via a fourth function g3 related to function f3 and a fourth function f4;

FIG. 14 is a block diagram of one example of an embodiment of the functions f3 and g3;

FIG. 15 is a block diagram of another example of an embodiment of the functions f3 and g3;

FIG. 16 is a block diagram of one example of an embodiment of the function f4;

FIG. 17 is a block diagram of another example of an embodiment of the function f4;

FIGS. 20A and 20B, taken together, are a block diagram of a third embodiment of a generating station wherein a first and second form of a key K are generated via a fifth function f5;

FIGS. 21A and 21B, taken together, are a block diagram of a fourth embodiment of a generating station wherein a first and second form of a key K are generated via a sixth function f6;

FIG. 22 is a block diagram of an example of an embodiment of function f5 and a related function g5;

FIG. 23 is a block diagram of an example of an embodiment of function f6 and a related function g6;

FIG. 26 is a graphical representation of one possible control vector which may be used in the practice of the present invention.

DETAILED DESCRIPTION OF THE INVENTION

INTRODUCTION

Figure 1:
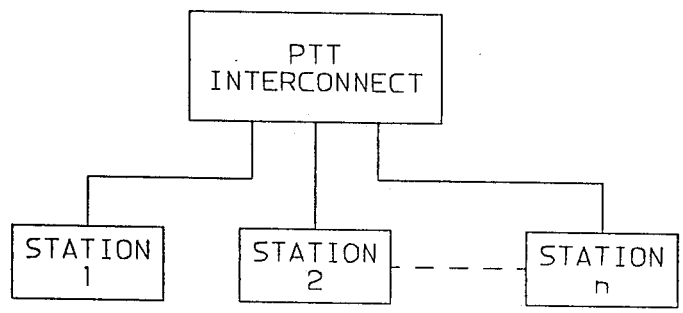
FIG. 1 is a block diagram illustrating a communication system in accordance with the present invention consisting of a multiplicity of communicating stations connected via a PTT (Post, Telephone and Telegraph) interconnect network.

Referring now to the drawings, and more particularly to FIG. 1, a network is shown in which the stations (computers, controllers, terminals, and the like) are connected via a PTT (Post, Telephone and Telegraph) interconnect network. Each such station has an encryption/decryption feature capable of end-to-end encryption with any other station in the network. The network referred to here might be an electronic funds transfer (EFT) or point of sales (POS) network.

Each such station has a cryptographic facility which performs cryptographic operations in support of the network encryption function, such that any station with an implemented cryptographic facility is capable of end-to-end encryption with any other station in the network. The network message formats and protocols necessary to support such cryptographic communication, including those messages necessary to support cryptographic keys and key management functions are not shown here as such messages and protocols are known in the prior art.

Figure 2:
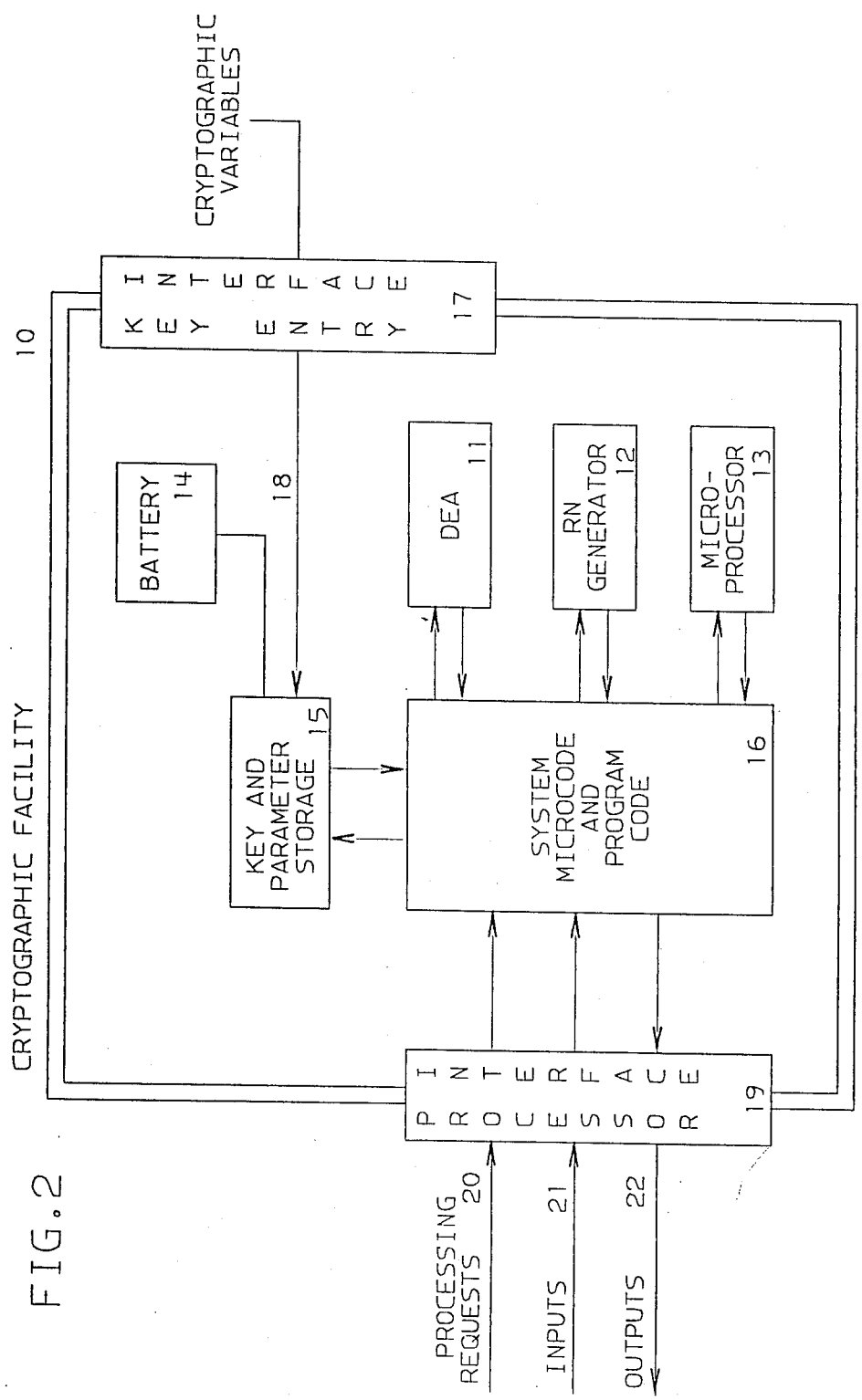
FIG. 2 is a block diagram showing a cryptographic facility capable of encryption/decryption via the Data Encryption Algorithm (DEA)

Referring now to FIG. 2, there is shown a cryptographic facility 10 containing a chip implementation of the Data Encryption Algorithm (DEA) 11, a hardware random number generator 12, a microprocessor 13, a battery 14, a battery-backed random access memory (RAM) 15 for storage of keys and other cryptographic variables, and a memory 16 for storage of system microcode and program code. Keys and cryptographic variables are loaded into the cryptographic facility via a key entry interface 17 and routed to memory 15 via a secure direct path 18. The cryptographic facility can be accessed logically only through inviolate processor interface 19, which is secure against intrusion, circumvention and deception, and which permits processing requests 20 and data inputs 21 to be presented to the cryptographic facility and transformed output 22 to be received from the cryptographic facility.

The cryptographic facility at each station in the network configuration of FIG. 1 has a Key Generation Function (KGF) and a Key Usage Function (KUF). Each key generated by a KGF has an associated control value C which prescribes how the key may be used; e.g., encrypt only, decrypt only, generation of message authentication codes, verification of message authentication codes, etc. The KUF provides a key authorization function to ensure that a requested usage of a key complies with the control value C, and in one aspect of the described invention it also serves as an authentication function to ensure that a requested key and control value are valid before allowing the key to be used. Thus, the KUF is the logical component of the cryptographic facility that enforces how keys are used at each using station, and in this sense, the KUFs collectively enforce the overall network key usage as dictated by the generating station.

Figure 3:
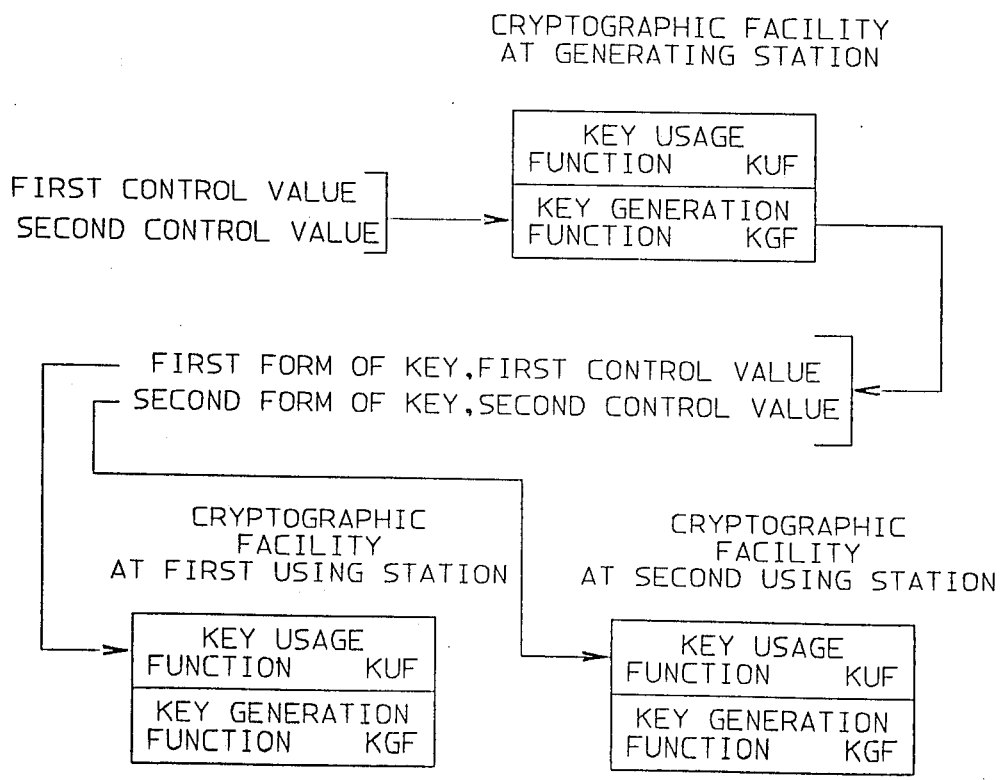
FIG. 3 is a block diagram showing three stations in the network configuration of FIG. 1 including a generating station and two using stations.

FIG. 3 depicts three stations in the network configuration of FIG. 1 comprising a generating station and two separate using stations. Each station has a KGF and a KUF, although only the designated generating station has need to exercise the KGF and only the designated using stations have need to exercise the KUF. Thus, it will be appreciated that any station in the network configuration of FIG. 1 can act as a generating station for any other stations acting as using stations, and that a generating station may also act as one of the intended using stations. Moreover, it will be appreciated that the present invention can be extended to cover the case where a generating station generates a key in several forms for distribution to several using stations, so that the invention is not limited to only two using stations. All of these combinations and variations are not specifically shown, but it should be evident from the description provided that all such cases are contemplated by the invention.

Referring again to FIG. 3, there is shown a key generated at the generating station via its KGF in a first form with a first control value C and in a second form with a second control value C, which may be the same or different from the first control value C. The generated first form of the key and the first control value are transmitted to a first using station and the generated second form of the key and the second control value are transmitted to a second using station. Thus, the KUF at the first using station permits the received first form of the key to be used only in the manner prescribed by the received first control value and the KUF at the second using station permits the received second form of the key to be used only in the manner prescribed by the received second control value, which may be the same or different from the first control value received by the first using station.

It will be appreciated that each form of the key (first form, second form, etc.) may consist of one or more parameter values representing the information or data necessary to recover, regenerate or reconstitute a previously generated key, and that this process of recovery or regeneration of the key, although not specifically shown in FIG. 3, always requires the use of a secret key available to, and known only to the receiving using station. These additional details are described herein below. It will be appreciated still further that additional cryptographic values, beyond those defined as the form of the key and the control value, such as using station unique public value and key authentication code, are defined under the invention. The purpose and use of each of these cryptographic quantities depends on the particular variation or aspect of the invention being described. Each such variation or aspect of the invention is treated more fully below.

The subject invention may be practiced using two different methods whereby a generating station can control how a cryptographic key may be used at the using station. The first method, which is illustrated by FIGS. 10 through 19, requires each key and control value, and possibly other key-related data, to be authenticated via a special authentication code before the received, recovered key may be used. The second method, which is illustrated by FIGS. 20 through 25, couples the key and control value during the key generation process such that the key is recovered correctly at a using station only if the correct control value has first been specified. Specification of an incorrect control value, in effect, causes a random, unknown key K to be recovered. Thus, if different, incorrect values of Ci and Cj are specified at using stations i and j, where there may even be collusion between i and j, the keys recovered by using stations i and j will be spurious (i.e., equal only by pure chance), and hence, no communication between using stations i and j with such incorrectly recovered keys is possible. By exchanging a short verification message which uses the recovered keys, using stations i and j can therefore verify that the key has been correctly recovered before using the key.

The invention may be further practiced by using two different methods whereby a generating station can control the using station or stations that may use a distributed cryptographic key. Both methods ensure that a firs using station i cannot use or beneficially misuse a key which has been designated for use at another using station j. In the first method, which is illustrated by FIGS. 10, 11, 12, 18, 20, 22, and 24, cryptographic separation among the keys designated for use at different using stations is accomplished by using different secret transport keys. Each using station shares a different, secret transport key (KR) with each generating station. Thus, at generating station a, transport key KRa,i is used for distribution of key K to using station i, whereas transport key KRa,j is used for distribution of key K to using station j. Under the key distribution procedure, a distributed key K and the transport key are coupled cryptographically such that key K is recovered correctly within the cryptographic facility at using station i only if the proper transport key KRa,i has first been initialized. Likewise, key K is recovered correctly within the cryptographic facility at using station j only if the proper transport key KRa,j has first been initialized. In the second method, which is illustrated by FIGS. 13, 14, 15, 16, 17, 19, 21, 23, and 25, cyrptographic separation among the keys designated for use at different using stations is accomplished by assigning and associating a unique, nonsecret value with each using station which is initialized in the cryptographic facility of each respective using station and by sharing a unique, secret transport key among the respective receiving using stations and the generating station. Thus, at generating station a, transport key KRi,j is used for distribution of key K to using stations i and j. The nonsecret or public value associated with each using station is designated PV, so that values PVi and PVj would be used for distribution of key K to using stations i and j, respectively. Under the key distribution procedure, a distributed key K, the public value PV, and the transport KR are coupled cryptographically such that key K is recovered correctly within the cryptographic facility at using station i only if the proper transport key KRi,j and the proper public value PVi have first been initialized. Likewise, key K is recovered correctly within the cryptographic facility at using station j only if the proper transport key KRi,j and the proper public value PVj have first been initialized.

From the description above, those skilled in the art will appreciate that FIGS. 10, 11, 12, and 18 cover the case where key authentication is used and cryptographic separation is achieved via different transport keys; FIGS. 20, 22 and 24 cover the case where key authentication is used and cryptographic separation is achieved via different public values associated with each using station and a common, secret transport key; FIGS. 13, 14, 15, 16, 17, and 19 cover the case where no key authentication is used and cryptographic separation is achieved via different transport keys; and FIGS. 21, 23 and 25 cover the case where no key authentication is used and cryptographic separation is achieved via different public values associated with each using station in conjunction with a common, secret transport key at each using station.

DEFINITIONS

Figure 4:
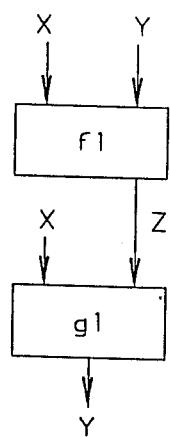
FIG. 4 is a block diagram illustrating the functional relationship between functions f1 and g1 as used in the invention.

According to the invention, several different cryptographic functions are defined. These are designated as functions f1, f2, f3, f4, f5, f6, g1, g3, g5, and g6. These function are used within the cryptographic facility of the generating and using stations for the purposes of key generation, key recovery, and key authentication. A precise definition of each function is given below:

1. Referring to FIG. 4, functions f1 and g1 are a pair of nonsecret cryptographic functions with the following properties:
    a. f1 and g1 each have two inputs and one output.
    b. The notation $f1(x,y)=z$ means that z is the output when f1 is applied to inputs x and y. Likewise, the notation $g1(x,z)=y$ means that y is the output when g1 is applied to inputs x and z.
    c. f1 is such that $f1(x,y)$ depends on each of the inputs x and y; g1 is such that $g1(x,z)$ depends on each of the inputs x and z.
    d. f1 and g1 are such that if $f1(x,y)=z$, then $g1(x,z)=y$. In effect, when the first input parameter of f1 and g1 are set equal, then g1 becomes the inverse of f1. Loosely speaking, the first input parameters of f1 and g1 are cryptographic keys.
    e. $f1(x,y)$ is easily calculated from x and y. Likewise, $g1(x,z)$ is easily calculated from x and z.
    f. For any given $f1(x,y)=z$, where z and y are known and x is unknown, it is computationally infeasible to calculate x from y and z. Likewise, for any given $g1(x,z)=y$, where z and y are known and x is unknown, it is computationally infeasible to calculate x from y and z. With respect to the use of f1 and g1 in the present invention, this property protects the secrecy of the fixed secret cryptographic key x even if the secret distributed key y should be compromised.
    g. For any given $f1(x,y)=z$, where z is known and x and y are unknown, it is computationally infeasible to calculate y from z. Likewise, for any given $g1(x,z)=y$, where z is known and x and y are unknown, it is computationally infeasible to calculate y from z. This protects the secrecy of the dynamically distributed secret key y.
    h. For any given $f1(x,y)=z$, where z is known and x and y are unknown, it is computationally infeasible to find a y' and z', where z' may be equal to z, which satisfy the relationship $f1(x,y')=z'$. Likewise, for any given $g1(x,z)=y$, where z is known and x and y are unknown, it is computationally infeasible to find a y' and a z', where z' may be equal to z, which satisfy the relationship $g1(x,z')=y'$. This prevents an opponent from forging a dynamically distributed key y that will be accepted by a using station.

Figure 5:
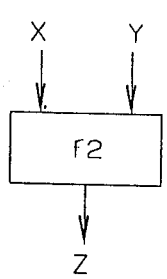
FIG. 5 is a block diagram of the function f2.

2. Referring to FIG. 5, function f2 is a nonsecret cryptographic function with the following properties:
   a. f2 has two inputs and one output.
   b. The notation f2(x,y)=z means that z is the output when f2 is applied to inputs x and y.
   c. f2 is such that f2(x,y) depends on each of the inputs x and y.
   d. f2(x,y) is easily calculated from x and y.
   e. For any given f2(x,y)=z, where y and z are known and x is unknown, it is computationally infeasible to calculate x from y and z. This protects the secrecy of the dynamically distributed secret key x.
   f. For any given f2(x,y)=z, where y and z are known and x is unknown, it is computationally infeasible to find a y'≠y and a z', where z' may be equal to z, such that f2(x,y')=z'. This prevents an opponent from forging a control value C and an authentication code that will be properly authenticated and accepted by a using station.

Figure 6:
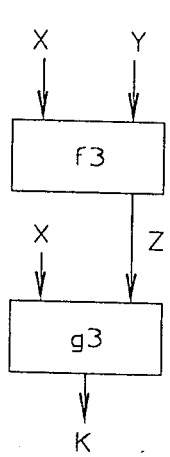
FIG. 6 is a block diagram showing the functional relationship between the functions f3 and g3.

3. Referring to FIG. 6, functions f3 and g3 are a pair of nonsecret cryptographic functions with the following properties:
   a. f3 and g3 each have two inputs and one output.
   b. The notation f3(x,y)=z means that z is the output when f3 is applied to inputs x and y. Likewise, the notation g3(x,z)=k means that k is the output when g3 is applied to inputs x and z. The value of k is the dynamically produced secret key being distributed.
   c. f3 is such that f3(x,y) depends on input y, but may or may not depend on input x. This distinguishes function f3 from function f1.
   d. Unlike functions f1 and g1, where f1(x,y)=z implies that g1(x,z)=y, functions f3 and g3 are such that f3(x,y)=z does not imply that g3(x,z)=y. This property may or may not hold for f3 and g3. The critical feature here is that f3 and g3 are less restrictive than functions f1 and g1, whereas, at the same time, they are such that the secret key k can be dynamically produced, distributed and recovered because of the guaranteed functional relationship g3(x,f3(x,y))=k. In effect, f3 and g3 permit a key distribution using one way functions rather than by using encryption and decryption, which are, by definition, reversible or two way functions.
   e. f3(x,y) is easily calculated from x and y. Likewise, g3(x,z) is easily calculated from x and z.
   f. For any given f3(x,y)=z, where z and y are known and x is unknown, it is computationally infeasible to calculate x from y and z. Likewise, for any given g3(x,z)=k, where z and k are known and x is unknown, it is computationally infeasible to calculate x from k and z. This protects the secrecy of the fixed secret cryptographic key x even if the secret distributed key y should become compromised.
   g. For any given g3(x,z)=k, where z is known and x and k are unknown, it is computationally infeasible to calculate k from z. This protects the secrecy of the dynamically distributed secret key k.
   h. If function f3 is such that k can be derived easily from y, or from y and other nonsecret data presumed available, then for any given f3(x,y)=z, where z is known and x and y are unknown, it is computationally infeasible to calculate y from z. Again, this protects the secrecy of the dynamically distributed secret key k.
   i. For any given g3(x,z)=k, where z is known and x and k are unknown, it is computationally infeasible to find a z' and k' which satisfy the relationship g3(x,z')=k'. This prevents an opponent form forging a dynamically distributed key k that will be accepted by a using station.
   j. If function f3 is such that k can be derived easily from y, or from y and other nonsecret data presumed available, then for any given f3(x,y)=z, where z is known and x and y are unknown, it is computationally infeasible to find a y' and z', where z' may be equal to z, which satisfy the relationship f3(x,y')=z'. Again, this prevents an opponent from forging a dynamically distributed key k that will be accepted by a using station.

Figure 7:
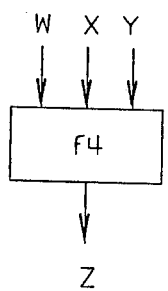
FIG. 7 is a block diagram of the function f4.

4. Referring to FIG. 7, function f4 is a nonsecret cryptographic function with the following properties:
   a. f4 has three inputs and one output.
   b. The notation f4(w,x,y)=z means that z is the output when f4 is applied to inputs w, x and y.
   c. F4 is such that f4(w,x,y) depends on each of the inputs w, x and y.
   d. f4(w,x,y) is easily computed from w, x and y.
   e. For any given f4(w,x,y)=z, where x, y and z are known and w is unknown, it is computationally infeasible to calculate w from x, y and z. This protects the secrecy of the dynamically distributed secret key w.
   f. For any given f4(w,x,y)=z, where x, y and z are known and w is unknown, it is computationally infeasible to find an x', y' and z', where x' or y' or both x' and y' are different from x and y, respectively, which satisfy the relationship f4(w,x',y')=z'. This prevents an opponent from forging a control value C and an authentication code for a given public value PV, which will be properly authenticated and accepted by a using station.

Figure 8:
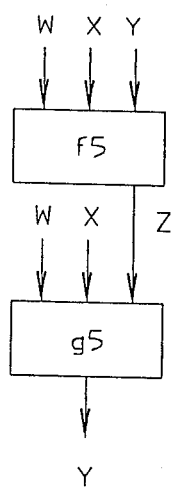
FIG. 8 is a block diagram showing the functional relationship between the functions f5 and g5.

5. Referring to FIG. 8, functions f5 and g5 are a pair of nonsecret cryptographic functions with the following properties:
   a. f5 and g5 each have three inputs and one output.
   b. The notation f5(w,x,y)=z means that z is the output when f5 is applied to inputs w, x and y. Likewise, the notation g5(w,x,z)=y means that y is the output when g5 is applied to inputs w, x and z.
   c. f5 is such that f5(w,x,y) depends on each of the inputs w, x and y. g5 is such that g5(w,x,z) depends on each of the inputs w, x and z.
   d. f5 and g5 are such that if f5(w,x,y)=z, then g5(w,x,z)=y. In effect, when the first and second input parameters of f5 and g5 are set equal, then g5 becomes the inverse of f5. For practical purposes, the input parameter w in functions f5 and g5 is a fixed secret cryptographic key.
   e. f5(w,x,y) is easily calculated from w, x and y. Likewise, g5(w,x,y) is easily calculated from w, x and z.
   f. For any given f5(w,x,y)=z, where z, x and y are known and w is unknown, it is computationally infeasible to calculate w from z, x and y. Likewise, for any given g5(w,x,z)=y, where z, x and y are known and w is unknown, it is computationally infeasible to calculate w from z, x and y. This protects the secrecy of the fixed secret cryptographic key w even if the secret distributed key y should become compromised.
   g. For any given f5(w,x,y)=z, where z and x are known and w and y are unknown, it is computationally infeasible to calculate y from z and x. Likewise, for any given g5(w,x,z)=y, where z and x are known and w and y are unknown, it is computationally infeasible to calculate y from z and x. This protects the secrecy of the dynamically distributed secret key y.

h. For any given f5(w,x,y)=z, where z and x are known and w and y are unknown, it is computationally infeasible to find an x', y' and z', where z' may be equal to z but x' or y' or both x' and y' are different from x and y, respectively, which satisfy the relationship f5(w,x',y')=z'. Likewise, for any given g5(w,x,z)=y, where z and x are known and w and y are unknown, it is computationally infeasible to find an x', y' and z', where z' may be equal to z but x' or y' or both x' and y' are different from x and y, respectively, which satisfies the relationship g5(w,x'z')=y'. This prevents an opponent from forging a dynamically distributed key y or a control value x or both which would be accepted by a using station.

Figure 9:
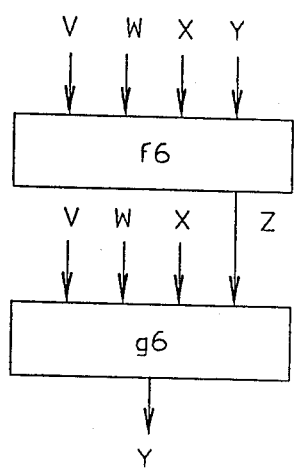
FIG. 9 is a block diagram showing the functional relationship between the functions f6 and g6.

6. Referring to FIG. 9, functions f6 and g6 are a pair of nonsecret cryptographic functions with the following properties:

a. f6 and g6 each have four inputs and one output.

b. The notation f6(v,w,x,y)=z means that z is the output when f6 is applied to inputs v, w, x, and y. Likewise, the notation g6(v,w,x,z)=y means that y is the output when g6 is applied to inputs v, w, x, and z.

c. f6 is such that f6(v,w,x,y) depends on each of the inputs v, w, x, and y. g6 is such that g6(v,w,x,z) depends on each of the inputs v, w, x, and z.

d. f6 and g6 are such that if f6(v,w,x,y)=z, then g6(v,w,x,z)=y. In effect, when the first, second and third input parameters of f6 and g6 are set equal, then g6 becomes the inverse of f6. For practical purposes, the input parameter v in functions f6 and g6 is a fixed secret cryptographic key.

e. f6(v,w,x,y) is easily calculated from v, w, x, and y. Likewise, g6(v,w,x,z) is easily calculated from v, w, x, and z.

f. For any given f6(v,w,x,y)=z, where z, w, x, and y are known and v is unknown, it is computationally infeasible to calculate v from z, w, x, and y. Likewise, for any given g6(v,w,x,z)=y, where z, w, x, and y are known and v is unknown, it is computationally infeasible to calculate v from z, w, x, and y. This protects the secrecy of the fixed secret cryptographic key w even if the secret distributed key y should become compromised.

g. For any given f6(v,w,x,y)=z, where z, w and x are known and v an y are unknown, it is computationally infeasible to calculate y from z, w and x. Likewise, for any given g6(v,w,x,z)=y, where z, w and x are known and v and y are unknown, it is computationally infeasible to calculate y from z, w and x. This protects the secrecy of the dynamically distributed secret key y.

h. For any given f6(v,w,x,y)=z, where z, w and x are known and v and y are unknown, it is computationally infeasible to find a w', x', y', and z', where z' may be equal to z but w' or x' or y' or some combination thereof are different from w, x and y, respectively, which satisfy the relationship f6(v,w',x',y')=z' Likewise for any given g6(v,w,x,z)=y, where z, w and x are known and v and y are unknown, it is computationally infeasible to find a w', x', y', and z', where z' may be equal to z but w' or x' or y' or some combination thereof are different from w, x and y, respectively, which satisfy the relationship g6(v,w',x',z')=y'. This prevents an opponent from forging a dynamically distributed key y or a control value x or both for a given using station with associated public value PV.

i. For any given g6(v,w,x,z)=y, where w, x and z are known and v and y are unknown, it is computationally infeasible to find a w', w'', x', x'', z', and z'', where w'≠w'' and x' and x'' are two different legitimate values of PV, which satisfy the relationship g6(v,w',x',z')=g6(v,w'',x'',z''). Note that the value of function g6 evaluated with inputs v, w', x', and z' or with inputs v, w'', x'', and z'' does not need to be known. This property prevents a special type of insider attack where two system users collude to construct alternate inputs with different control values that will allow the same distributed secret key y'=y'' to be initialized at two different using stations whose associated public values are x' and x'', even though the users themselves do not know the value of y'=y''. This specific property is needed since the generating station uses the same value of v in function f6 when calculating the first and second forms of the key to be distributed to two different using stations.

Example embodiments for functions f1 through f6, g1, g3, g5, and g6 which satisfy the functional definitions given above are provided in FIGS. 11, 12, 15, 16, 17, 22, and 23. These are described in more detail hereinafter.

DESCRIPTION OF THE PREFERRED EMBODIMENTS

Figure 10B:
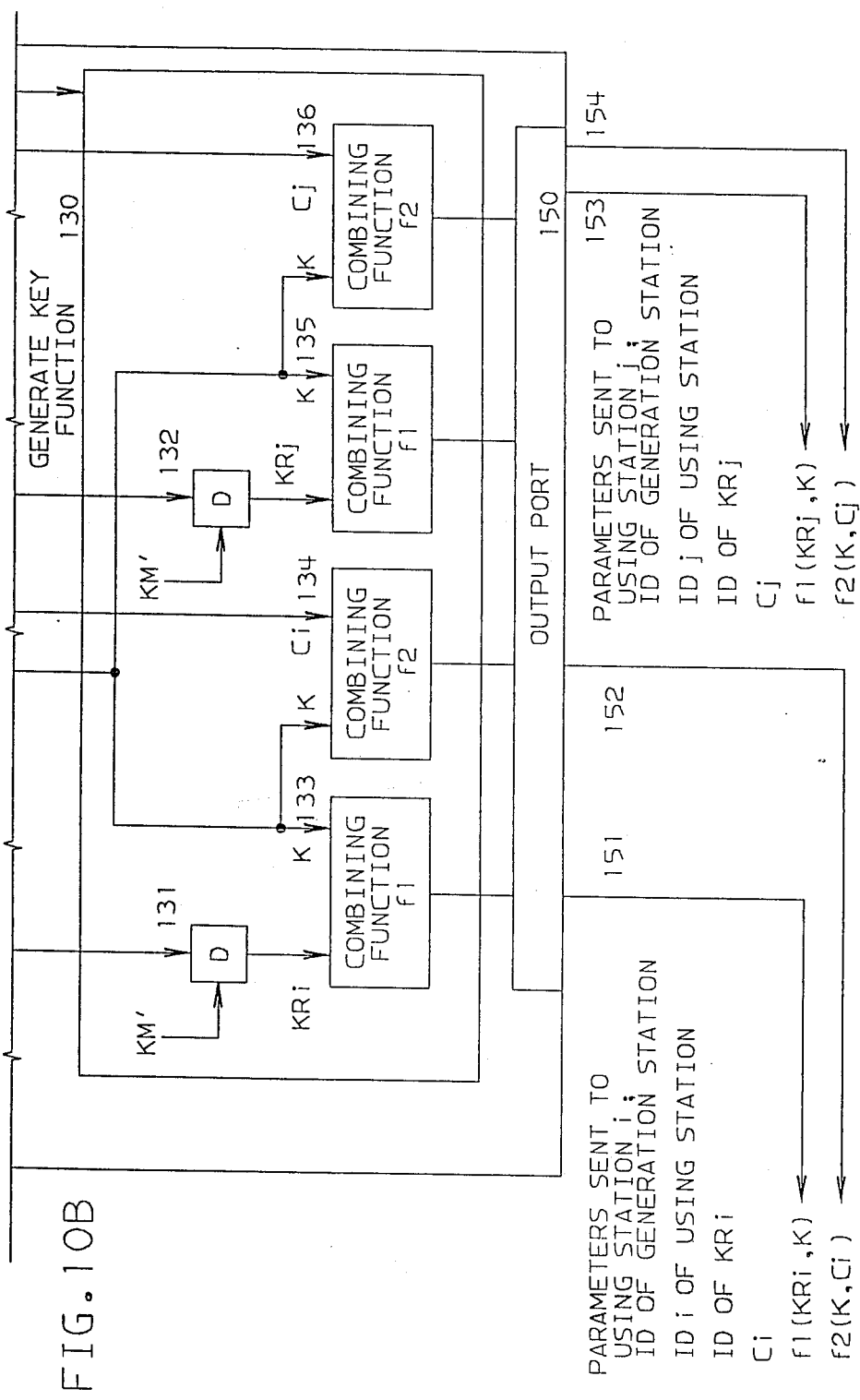

Referring now to FIGS. 10A and 10B, a first embodiment of a generating station is shown wherein a first and second form of a key K are generated via a first function f1 and a first and second key authentication code are generated via a second function f2. In FIG. 10, there is shown a data base 100 and a cryptographic facility 110 containing a command decoder 115, a random key generator 120, a generate key function 130, a command port 140, an input port 145, and an output port 150. Each using station i shares a unique secret transport key, KRi, with the generating station, which is used by the generating station to encrypt and forward data keys to that using station. These transport keys, KR1, KR2, . . . , KRn, are encrypted under a prescribed variant of the master key of the generating station, KM', and this list of encrypted transport keys, which is indexed by the IDs of the using stations, is stored in data base 100.

Those skilled in the art will understand that the generating station also has a central processing unit (CPU) which manages and controls the key generation process. The CPU (not shown) determines the IDs of the using stations for which keys are to be generated, it determines the control values associated with the keys for each using station, it accesses encrypted transport keys from the data base 100, and it issues generate key commands to the cryptographic facility 110 together with the appropriate control values and encrypted keys. Since CPUs and the processes performed by them in this context are well known in the art, no further description of the CPU and the operations performed by it are needed for an understanding of the present invention.

The steps involved in generating a data key K for using stations i and j can be traced in FIG. 10. The CPU first determines that a data key is to be distributed to using stations i and j, i.e., with identifiers IDi and IDj, and that the control values at using stations i and j are Ci and Cj, respectively. The identifiers IDi and IDj are used via line 160 to access the encrypted transport keys eKM'(KRi) and eKM'(KRj), from data base 100, and these encrypted keys are read out on line 165. A "generate key" command on line 170 is input to command port 140 of the cryptographic facility. The encrypted transport keys, eKM'(KRi) and eKM'(KRj), and the control values, Ci and Cj, are presented as data inputs at input port 145. In response to the "generate key" command, the command decoder at 115 produces an active generate key function on line 125, which enables the generate key function 130. Once enabled, the generate key function 130 will accept inputs Cj, eKM'(KRj), Ci, and eKM'(KRi), from input port 145 and a random data key K from random key generator 120.

The inputs are processed as follows. The value eKM'(KRi) is decrypted at 131 under master key variant KM'. KM' is a dynamically generated variant of the master key, KM, where KM is stored in the key and parameter storage of the cryptographic facility 110, as shown in FIG. 2, and is available for use by the generate key function 130. The decrypted output KRi and the data key K are processed via combining function f1 at 133 to produce output f1(KRi,K). The data key K and the input control value Ci are processed via combining function f2 at 134 to produce output f2(K,Ci). The value eKM'(KRj) is decrypted at 132 under master key variant KM'. The decrypted output KRj and the data key K are processed via combining function f1 at 135 to produce output f1(KRj,K). The data key K and the input control value Cj are processed via combining function f2 at 136 to produce output f2(K,Cj). The four values f1(KRi,K), f2(K,Ci), f1(KRj,K), and f2(K,Cj) are then presented as outputs at output port 150, and appear on lines 151, 152, 153, and 154, respectively.

Those skilled in the art will understand that the serial data represented by f1(KRi,K) on line 151 and the serial data f2(K,Ci) on line 152 are loaded into respective shift registers and are read out in parallel to an output buffer. The output buffer is loaded in parallel with a header and synchronizing data from another register. The data in the output buffer is then read out serially and sent to using station i over a communication link in a conventional manner. In like manner, the serial data represented by f1(KRj,K) on line 153 and the serial data f2(K,Cj) on line 154 are loaded into respective shift registers and are read out into an output buffer. The output buffer has a header and synchronizing data. The data in the output buffer is then read out and sent to using station j. Obviously, the output shift registers and buffer may be multiplexed to sequentially transmit data first to using station i and then to using station j.

FIG. 11 shows an example of an embodiment for the function f1. As defined, f1 has two inputs and one output. The inputs are K and KR. f1 comprises an encryption facility E whereby input K is encrypted with KR to provide an output eKR(K).

FIG. 12 shows an example of an embodiment for the function f2. As defined, f2 has two inputs and one output. In this case, the inputs are K and C. f2 comprises an encryption facility E whereby input C is encrypted with K. f2 also comprises an exclusive OR logic which combines the output of the encryption facility with C to produce the output $eK(C) \oplus C$.

Referring now to FIGS. 13A and 13B, a second embodiment of a generating station is shown wherein a first and second form of a key K are generated via a third function f3 and a first and second key authentication code are generated via a fourth function g3, which is related to function f3, and a fourth function f4. In FIGS. 13A and 13B, there is shown a data base 200 of encrypted keys, a data base 205 of public values, and a cryptographic facility 210 containing a command decoder 215, a random number generator 220, a generate key function 230, a command port 240, an input port 245, and an output port 250. Each pair of using stations i and j that can communicate share a common secret transport key KRij, which is also shared with the generating station. The generating station uses KRij to generate certain cryptovariables which are then sent to using stations i and j. These received cryptovariables are sufficient to allow using stations i and j to regenerate a common data key K. By referring to the combining functions f3 and g3, it will be more fully appreciated that key distribution is accomplished, loosely speaking, via one-way functions instead of using a method of encrypting K at the generating station and decryption to recover K at the receiving using stations. These transport keys, KR1,2, KR1,3, . . . , KRn,n-1, are encrypted under a prescribed variant of the master key of the generating station, KM', and this list of encrypted transport keys, which is indexed by the respective IDs of the using stations, is stored in data base 200.

Also associated with each using station i is a public value, PVi. These public values are used to cryptographically distinguish and separate the cryptovariables designated for and transmitted to each respective using station, and the procedure for key distribution is such that the cryptovariables produced and sent to using station i cannot be beneficially used or misused at another using station j. These public values PV1, PV2, . . . , PVn, indexed by the ID of the using station, are stored in data base 205.

The generating station also has a central processing unit (CPU) which manages and controls the key generation process. The CPU determines the IDs of the using stations for which keys are to be generated, it determines the control values associated with the keys for each using station, it accesses encrypted keys and public values from the data base, and it issues generate key commands to the cryptographic facility together with the appropriate control values, public values, and encrypted keys.

The steps involved in generating a data key K for using stations i and j can be traced in FIG. 13. The CPU first determines that a data key is to be distributed to using stations i and j, i.e., with identifiers IDi and IDj, that the control values at using stations i and j are Ci and Cj, respectively, and that the public values at using stations i and j are PVi and PVj, respectively. The identifiers IDi and IDj are used via line 260 to access the encrypted transport key eKM'(KRij) from data base 200, and this encrypted key is read out on lie 261. The identifiers IDi and IDj are also used via line 262 to access the public values PVi and PVj from data base 205, and these public values are read out on line 263. A "generate key" command on line 270 is input to command port 240 of the cryptographic facility 210. The encrypted transport key eKM'(KRi,j), the public values PVi and PVj, and the control values Ci and Cj are presented as data inputs at input port 245. In response to the "generate key" command, the command decoder 215 produces an active generate key function on line 225, which enables the generate key function 230. Once enabled, the generate key function 230 will accept the inputs eKM'(KRij), PVj, Cj, PVi, and Ci from input port 245 and a random number RN from random number generator 220.

The inputs are processed as follows. The value eKM'(KRij) is decrypted at 231 under master key variant KM'. KM' is a dynamically generated variant of the master key, KM, where KM is stored in the key and parameter storage of the cryptgraphic facility, as shown in FIG. 2, and is available for use by the generate key function 230. The decrypted output KRij and the random number RN are processed via combining function f3 at 232 to produce output f3(KRij,RN). The decrypted output KRij and the so-produced output f3(KRij,RN) are processed via combining function g3 at 233 to produce output data key K. The data key K, the input control value Ci, and the input public value PVi are processed via combining function f4 at 234 to produce output f4(K,Ci,PVi), and the data key K, the input control value Cj, and the input public value PVj are processed via combining function f4 at 235 to produce output f4(K,Cj,PVj). The three values f3(KRij,RN), f4(K,Ci,PVi), and f4(K,Cj,PVj) are then presented as outputs at output port 250 and appear on output lines 251, 252 and 253, respectively.

The serial data represented by f4(K,Ci,PVi) on line 252 and the serial data f3(KRij,RN) on line 251 are loaded into respective shift registers and are read out in parallel to an output buffer. The output buffer is loaded with a header and synchronizing data from another register. The data in the output buffer is then read out serially and sent to using station i. In like manner, the serial data represented by f4(K,Cj,PVj) on line 253 and the serial data f3(KRij,RN) on line 251 are loaded into respective shift registers and are read out in parallel to the output buffer. The output buffer is loaded with a header and synchronizing data from another register. The data in the output buffer is read out serially and transmitted to using station j.

FIG. 14 shows an example of an embodiment of the functions f3 and g3. As defined, each of these functions has two inputs and one output. In the case of f3, the inputs are KR and RN; however, the output is a straight through connection of the input RN. In the case of g3, the inputs are again KR and RN. g3 comprises an encryption facility E in which RN is encrypted under KR. g3 also comprises an exclusive OR logic which combines the output of the encryption facility E with the input RN to produce the output $eKR(RN) \oplus RN$, where $eKR(RN) \oplus RN$ is defined as the data key K.

FIG. 15 shows another example of an embodiment of the functions f3 and g3. In this case, f3 comprises an encryption facility E which encrypts RN under KR to produce the output eKR(RN). g3 comprises a decryption facility D which decrypts eKR(RN) under KR to produce RN as the output, where RN is defined as the data key K.

FIG. 16 shows an example of an embodiment of the function f4. By definition, f4 has three inputs and one output. The inputs are K, C and PV f4 comprises first and second encryption facilities E and exclusive OR logic. The first encryption facility encrypts C under K to produce eK(C) which is combined in the exclusive OR logic with PV to produce $eK(C) \oplus PV$. The output of the exclusive OR logic is encrypted under the second encryption facility to produce the output function f4(K,C,PV).

FIG. 17 shows another example of an embodiment of the function f4. In this example, there are three encryption facilities and three exclusive OR logics. The first encryption facility encrypts K under KI, where KI is a fixed nonsecret key, to produce eKI(K) which is exclusive ORed with K to yield $eKI(K) \oplus K$. This output, which will be referred to as K1, is used to encrypt C in the second encryption facility, the output of which is exclusive ORed with C to produce $eK1(C) \oplus C$. This output, which will be referred to as K2, is in turn used to encrypt PV in the third encryption facility, the output of which is exclusive ORed with PV to provide the output $eK2(PV) \oplus PV = f4(K,C,PV)$.

Referring now to FIGS. 13A and 13B, there is shown a first embodiment of a using station related to the first embodiment, of the generating station shown in FIGS. 10A and 10B wherein the received key K is recovered via a function g1, which is related to the function f1, and wherein the received key authentication code is authenticated via the function f2. FIGS. 13A and 13B shows a data base 300 and a cryptographic facility 310 containing a command decoder 315, and "operation allowed" procedure 320, an "abort operation" procedure 327, a check procedure 330, a command port 340, an input port 345, an output port 350, and microcode 380 to perform a requested operation. Each using station i shares a unique secret transport key, KRi, with the generating station, which is used by the receiving station to receive encrypted data keys from the generating station. The transport keys shared with each generating station are encrypted under a prescribed variant of the master key of the using station, KM', and these encrypted transport keys are stored in data base 300. If there were only one generating station and one key shared with that generating station, then there would be only one encrypted transport key in data base 300. The encrypted transport keys in data base 300 are indexed by an identifier, here referred to as "ID of KR", which uniquely identifies each key in the list. Thus, in FIG. 18, "ID of KRi" refers to a particular KRi which using station i has shared with the generating station, and is the same KRi used by the generating station to communicate with using station i.

The using station also has a central processing unit (CPU) which manages and controls the key recovery and key usage process. The CPU (not shown) receives a formatted message from the generating station, which contains the ID of the generating station, the IDi of the intended receiving station, the ID of KRi, a control value Ci, a first value f1(KRi,K), and a second value f2(K,Ci). The CPU parses messages received from the generating station, extracts data parameters, accesses encrypted transport keys from its data base, and presents key and data parameters to the cryptographic facility 310 in conjunction with requested cryptographic operations.

Figure 18A:
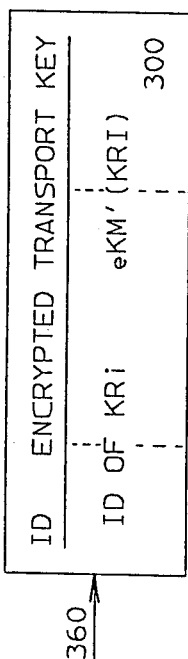
FIGS. 18A and 18B, taken together, are a block diagram showing a first embodiment of a using station related to the first embodiment of a generating station shown in FIGS. 10A and 10B wherein the received key K is recovered via a function g1, which is related to the function f1, and wherein the received key authentication code is authenticated via the function f2.
Figure 18B:
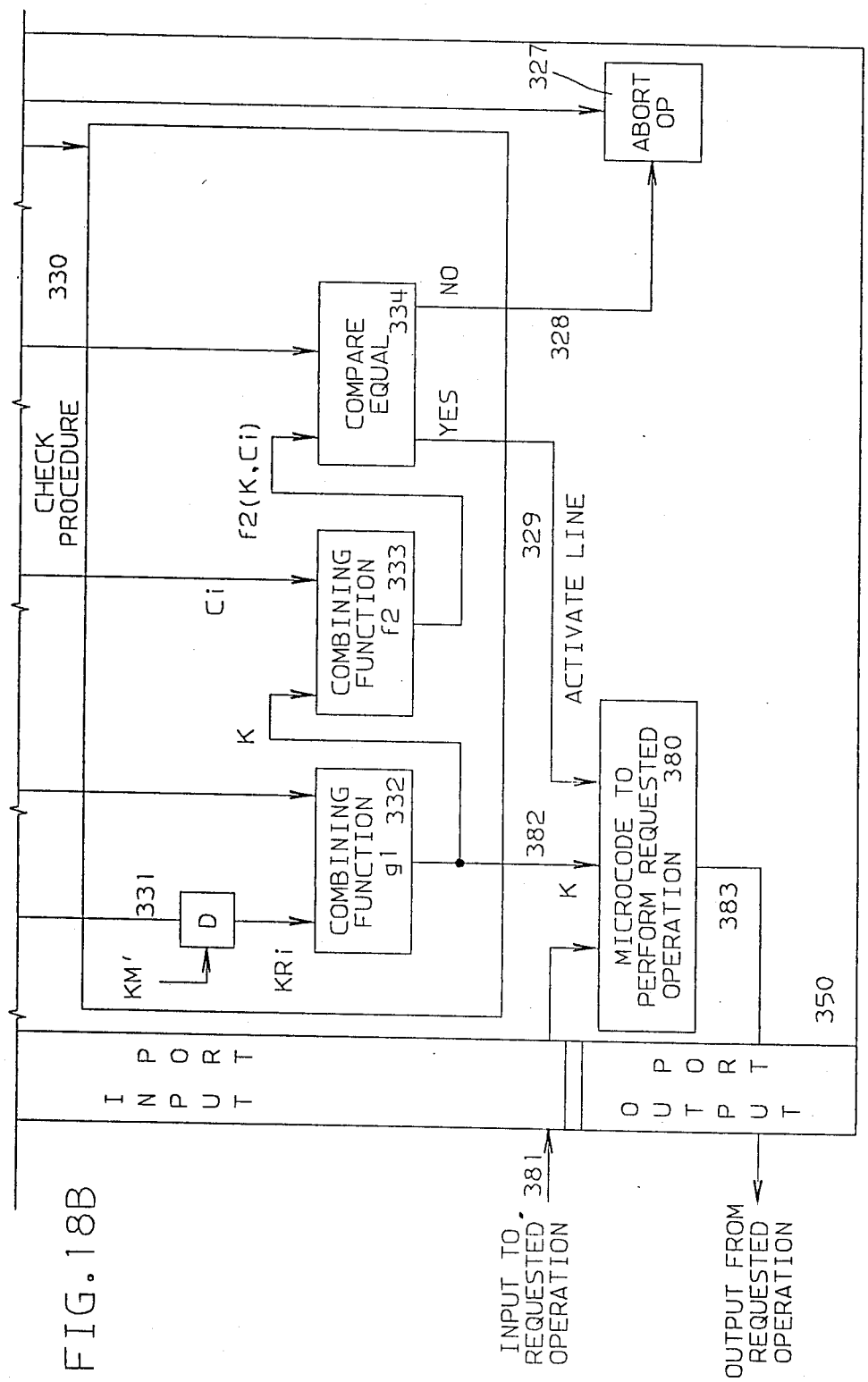

The steps involved in using a data key K at using station i can be traced in FIG. 18. The CPU first determines that a received data key K is to be used in a specific requested cryptographic operation. Using the received value of "ID of KRi", the encrypted transport key eKM'(KRi) is accessed from the data base 300 via line 360, and the encrypted key is read out on line 365. A requested operation on line 370 is input to command port 340 of the cryptographic facility. The encrypted transport key eKM'(KRi) accessed from data base 300, the control value Ci, value f1(KRi,K), and value f2(K,Ci) extracted from the received message, and other inputs necessary to the requested cryptographic operation, are presented as data inputs at input port 345. In response to the requested operation, the command decoder 315 activates the "operation allowed" procedure 320. Once enabled, the "operation allowed" procedure 320 will accept inputs f2(K,Ci), Ci, f1(KRi,K), and eKM'(KRi) from input port 345. These inputs are temporarily stored in the cryptographic facility 310. Using the just read value of Ci, the "operation allowed" procedure 320 determines whether the usage of data key K in the requested operation is authorized or granted on the basis of data in the control value Ci. If so, then the "operation allowed" procedure 320 produces an activate check procedure on line 325 that enables the check procedure 330. If the use is not authorized, then the "operation allowed" procedure 320 produces an activate abort on line 326. Once enabled, the abort operation 327 erases the inputs read from input port 345 and temporarily stored in the cryptographic facility 310 and enables another requested operation via command port 340. Once enabled, the check procedure 330 will accept inputs f2(K,Ci), Ci, f1(KRi,K), and eKM'(KRi), which have been temporarily stored in the cryptographic facility 310.

The inputs are processed as follows. The value eKM'(KRi) is decrypted at 331 under master key variant KM'. KM' is a dynamically generated variant of the master key KM, where KM is stored in the key and parameter storage of the cryptographic facility 310, as shown in FIG. 2, and is available for use by the check procedure 330. The decrypted output KRi and the input value f1(KRi,K) are processed via combining function g1 at 332 to produce output data key K. The so-produced data key K and the input control value Ci are processed via combining function f2 at 333 to produce output f2(K,Ci). The so-produced value f2(K,Ci) and the input value f2(K,Ci) are compared for equality at 334. If not equal, then an activate abort operation is produced on line 328. If equal, then an activate "microcode to perform requested operation" is produced on line 329. Once enabled, the abort operation 327 erases the inputs read from input port 345 and temporarily stored in the cryptographic facility 310 and enables another requested operation via command port 340. Once enabled, the microcode to perform requested operation 380 will accept input to requested operation on line 381 via input port 345 and the so-produced data key K on line 382, which is the output from combining function g1 at 332. The requested operation is then performed at 380 using these key and data inputs. The output of the requested operation 380 is then presented at output port 350 and appears on line, 383.

Figure 19A:
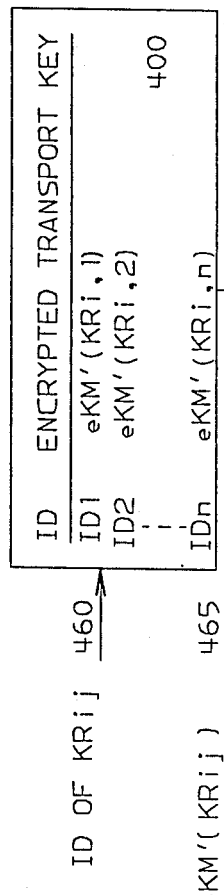
FIGS. 19A and 19B, taken together, are a block diagram showing a second embodiment of a using station related to the second embodiment of the generating station shown in FIGS. 13A and 13B wherein the received key K is recovered via a function g3, which is related to function f3, and wherein the received key authentication code is authenticated via the function f4.
Figure 19B:
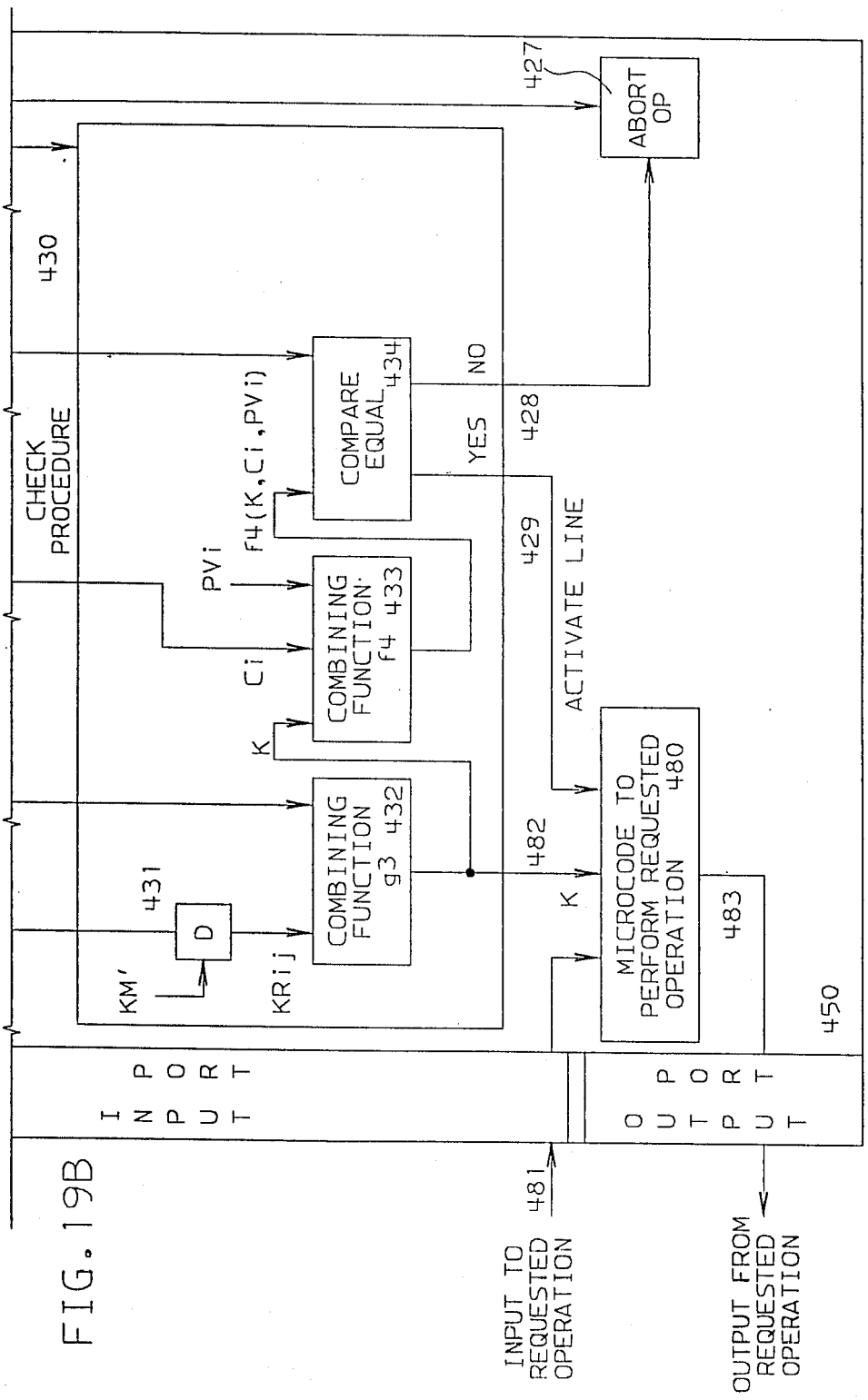

Referring now to FIGS. 13A and 19B, there is shown a second embodiment of a using station related to the second embodiment of the, generating station shown in FIGS. 13A and 13B wherein the data key K is regenerated or recovered via a function g3, which is related to function f3, and wherein the received key authentication code is authenticated via the function f4. FIGS. 13 and 19B shows a data base 400 and a cryptographic facility 410 containing a command decoder 415, an "operation allowed" procedure 420, an "abort operation" procedure 427, a check procedure 430, a command port 440, an input port 445, an output port 450, and microcode to perform requested operation 480. Each pair of using stations i and j share a unique secret transport key, KRi,j, which is also shared with the generating station. The transport key KRij is used by using station i to recover or regenerate data keys from information received from a generating station, where the so-recovered or so-regenerated data keys will be used for communication with using station j, and vice versa. The transport keys shared in common with each other using station, and also with the generating station, are encrypted under a prescribed variant of the master key of the receiving station, KM', and these encrypted transport keys are stored in data base 400. The encrypted transport keys in data base 400 are indexed by an identifier which uniquely relates the key to using station j. Thus, in FIG. 19, the term "ID of KRij" is the identifier of KRij, which is the transport key that using station i shares with using station j.

The using station also has a central processing unit (CPU) which manages and controls the key recovery and key usage process. The CPU receives a formatted message from the generating station, which contains the ID of the generating station, the IDi of the intended using station, the ID of KRij, a control value Ci, a first value f4(K,Ci,PVi), and a second value f3(KRij,RN). The CPU parses messages received from the generating station, extracts data parameters, accesses encrypted transport keys from its data base, and presents key and data parameters to the cryptographic facility 410 in conjunction with requested cryptographic operations.

The steps involved in using a data key K at using station i can be traced in FIGS. 19 and 19B. The CPU first determines that a received data key K is to be used in a specific requested cryptographic operation. Using the received value of "ID of KRij", the encrypted transport key eKM'(KRij) is accessed from the data base 400 via line 460, and the encrypted key is read out on line 465. A requested operation on line 470 is input to command port 440 of the cryptographic facility 410. The encrypted transport key eKM'(KRij) accessed from data base 400, the value f4(K,Ci,PVi), control value Ci, and value f3(KRij,RN) extracted from the received message, and other inputs necessary to the requested cryptographic operation but not received in the same message from the generating station, are presented as data inputs at input port 445. In response to the requested operation, the command decoder at 415 activates the "operation allowed" procedure 420. Once enabled, the "operation allowed" procedure 420 will accept inputs f4(K,Ci,PVi), Ci, f3(KRij,RN) and eKM'(KRij) from input port 445. These inputs are temporarily stored in the cryptographic facility 410. Using the just read value of Ci, the "operation allowed" procedure determines whether the usage of data key K in the requested operation is authorized or granted on the basis of data in the control value Ci. If so, then the "operation allowed" produces an activate check procedure on line 425, which enables the check procedure 430. If not, then the "operation allowed" procedure 420 produces an activate abort operation on line 426. Once enabled, the abort operation 427 erases the inputs read from input port 445 and temporarily stored in the cryptographic facility 410 and enables another requested operation via command port 440. Once enabled, the check procedure 430 will accept inputs f4(K,Ci,PVi), Ci, f3(KRij,RN), and eKM'(KRij) which have been temporarily stored in the cryptographic facility 410.

The inputs are processed as follows. The value eKM'(KRij) is decrypted at 431 under master key variant KM'. KM' is a dynamically generated variant of the master key KM, where KM is stored in the key and parameter storage of the cryptographic facility 410, as shown in FIG. 2, and is available for use by the check procedure 430. The decrypted output KRij and the input value f3(KRij,RN) are processed via combining function g3 at 432 to produce output data key K. The so-produced data key K, the input control value Ci, and public value PVi are processed via combining function f4 at 433 to produce output f4(K,Ci,PVi). The public value PVi associated with using station i is stored in the key and parameter storage of the cryptographic facility 410, as shown in FIG. 2, and is available for use by the check procedure 430. The so-produced value f4(K,Ci,PVi) and the input value f4(K,Ci,PVi) are compared for quality at 434. If not equal, then an activate abort operation is produced on line 428; but if equal, an activate "microcode to perform requested operation" is produced on line 429. Once enabled, the abort operation 427 erases the inputs read from input port 445 and temporarily stored in the cryptographic facility 410 and enables another requested operation via command port 440. Once enabled, the microcode to perform requested operation 480 will accept input to requested operation on line 481 via input port 445 and the so-produced key K on line 482, which is the output from combining function g3 at 432. The requested operation is then performed at 480 using these key and data inputs. The output of the requested operation 480 is then presented at output port 450 and appears on line 483.

Figure 20B:
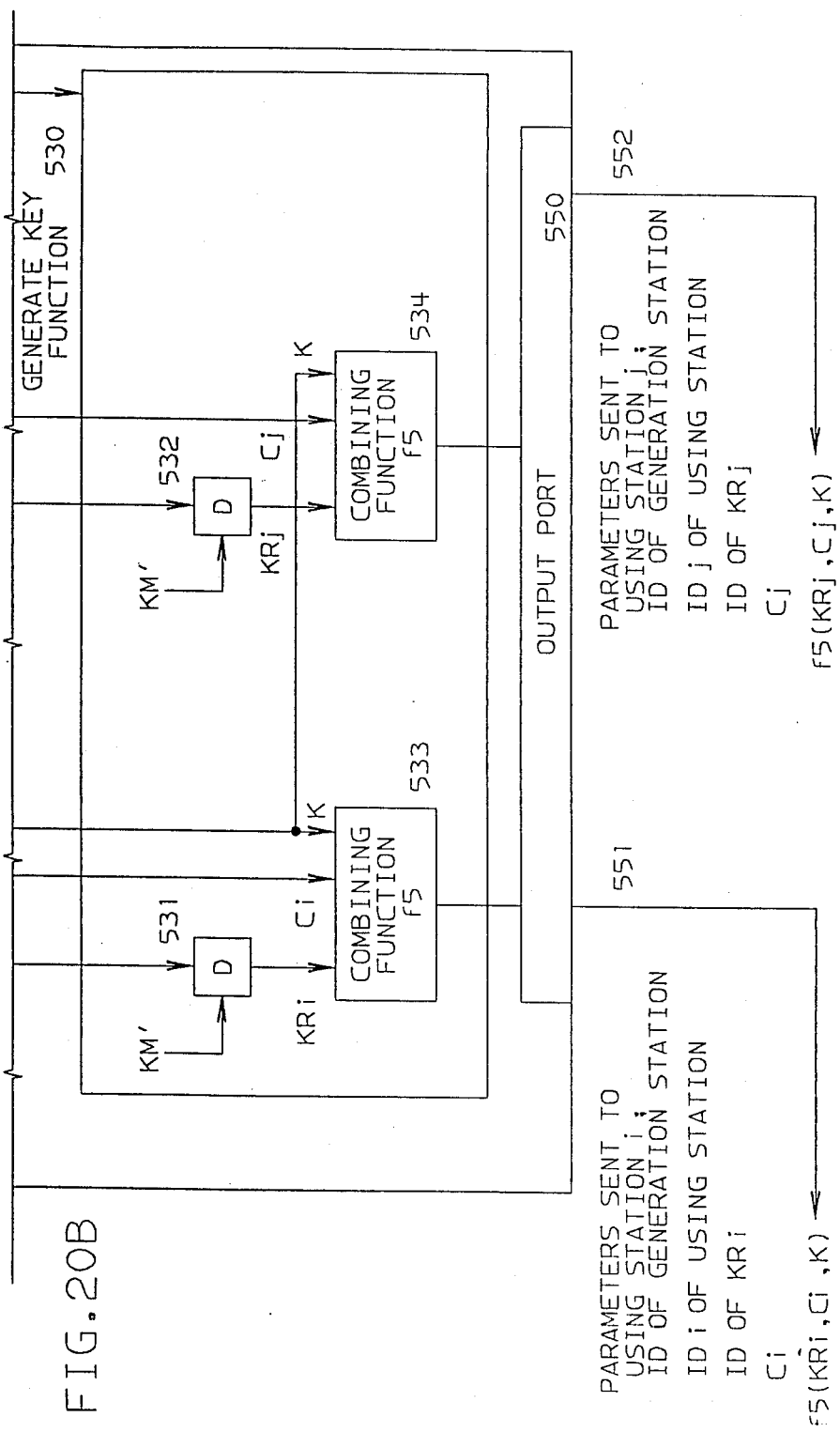

Referring now to FIGS. 20A and 20B, there is shown a third embodiment of a generating station wherein a first and second form of a key K are generated via a fifth function f5. In FIGS. 20A and 20B, there is shown a data base 500 and a cryptographic facility 510 containing a command decoder 515, a random key generator 520, a generate key function 530, a command port 540, an input port 545, and an output port 550. Each using station i shares a unique secret transport key, KRi, with the generating station, which is used by the generating station to encrypt and forward data keys to that using station. These transport keys, KR1, KR2, ..., KRn, are encrypted under a prescribed variant of the master key of the generating station, KM', and this list of encrypted transport keys, which is indexed by the IDs of the using stations, is stored in data base 500.

The generating station also has a central processing unit (CPU) which manages and controls the key generation process. The CPU determines the IDs of the using stations for which keys are to be generated, it determines the control values associated with the keys for each using station, it accesses encrypted keys from the data base, and it issues generate key commands to the cryptographic facility together with the appropriate control values and encrypted keys.

The steps involved in generating a data Key K for using stations, i and j can be traced in FIGS. 21A and 21B. The CPU first determines that a data key is to be distributed to using stations i and j, i.e., with identifiers IDi and IDj, and that the control values at using stations i and j are Ci and Cj, respectively. The identifiers IDi and IDj are used via line 560 to access the encrypted transport keys, eKM'(KRi) and eKM'(KRj), from the data base 500, and these encrypted keys are read out on line 565. A "generate key" command on line 570 is input to command port 540 of the cryptographic facility 510. The encrypted transport keys, eKM'(KRi) and eKM'(KRj), and the control values Ci and Cj, are presented as data inputs at input port 545. In response to the "generate key" command, the command decoder 515 produces an active generate key function on line 525, which enables the generate key function 530. Once enabled, the generate key function 530 will accept inputs Cj, eKM'(KRj), Ci, and eKM'(KRi) from input port 545 and a random data key K from random key generator 520.

The inputs are processed as follows. The value eKM'(KRi) is decrypted at 531 under master key variant KM'. KM' is a dynamically generated variant of the master key KM, where KM is stored in the key and parameter storage of the cryptographic facility 510, as shown in FIG. 2, and is available for use by the generate key function 530. The decrypted output KRi, the control value Ci, and the data key K are processed via combining function f5 at 533 to produce output f5(KRi,Ci,K). The value eKM'(KRj) is decrypted at 532 under master key variant KM'. The decrypted output KRj, the control value Cj, and K are processed via combining function f5 at 534 to produce output f5(KRj,Cj,K). The two values f5(KRi,Ci,K) and f5(KRj,Cj,K) are then presented as outputs at output port 550 and appear on output lines 551 and 552, respectively.

The serial data represented by f5(KRi,Ci,K) on line 531 is loaded into a shift register and read out into an output buffer. The output buffer is also loaded with a header and synchronizing data. The data in the output buffer is then read out serially and sent to using station i. In like manner, the serial data represented by f5(KRj,Cj,K) on line 552 is loaded into a shift register and read out into an output buffer. The output buffer is also loaded with a header and synchronizing data. The data in the output buffer is then read out serially and sent to using station j.

Referring now to FIG. 21A and 21B, there is shown a fourth embodiment of a generating station wherein a first and second form of a key K are generated via a sixth function f6. In FIGS. 21A and 21B, there is shown a data base 600 of encrypted transport keys, a data base of public values 605, and a cryptographic facility 610 containing a command decoder 615, a random key generator 620, a generate key function 630, a command port 640, an input port 645, and an output port 650. Each pair of using stations i and j that can communicate share a common secret transport key KRij, which is also shared with the generating station. The generating station uses KRij to encrypt and forward data keys to using stations i and j. These transport keys, KR1,2, KR1,3, ..., KRn,n-1, are encrypted under a prescribed variant of the master key of the generating station, KM', and this list of encrypted transport keys, which is indexed by the respective IDs of the using stations, is stored in data base 600.

Also associated with each using station i is a public value, PVi, which is used by the generating station to distinguish data keys sent to using station i via transport key KRij from data keys sent to using station j, also via transport key KRij. These public values PV1, PV2, ..., PVn, indexed by the ID of the using station, are stored in data base 605.

The generating station also has a central processing unit (CPU) which manages and controls the key generation process. The CPU determines the IDs of the using stations for which keys are to be generated, it determines the control values associated with the keys for each using station, it accesses encrypted keys and public values from the data base, and it issues generate key commands to the cryptographic facility together with the appropriate control values, public values, and encrypted keys.

The steps involved in generating a data key K for using stations i and j can be traced in FIG. 21. The CPU first determines that a data key is to be distributed to using stations i and j, i.e., with identifiers IDi and IDj, that the control values at using stations i and j are Ci and Cj, respectively, and that the public values at using stations i and j are PVi and PVj, respectively. The identifiers IDi and IDj are used via line 660 to access the encrypted transport key eKM'(KRij) from data base 600, and this encrypted key is read out on line 661. The identifiers IDi and IDj are also used via line 662 to access the public values PVi and PVj from data base 605, and these public values are read out on line 663. A "generate key" command on line 670 is input to command port 640 of the cryptographic facility 610. The encrypted transport key eKM'(KRij), the public values PVi and PVj, and the control values Ci and Cj are presented as data inputs at input port 645. In response to the "generate key" command, the command decoder 615 produces an active generate key function on line 625, which enables the generate key function 630. Once enabled, the generate key function 630 will accept inputs eKM'(KRij), PVj, Cj, PVi, and Ci from input port 645 and a random data key K from random key generator 620.

The inputs are processed as follows. The value eKM'(KRij) is decrypted at 631 under master key variant KM'. KM' is a dynamically generated variant of the master key KM, where KM is stored in the key and parameter storage of the cryptographic facility 610, as shown in FIG. 2, and is available for use by the generate key function 630. The decrypted output KRij, the control value Ci, the public value PVi, and the random data key K are processed via combining function f6 at 632 to produce output f6(KRij,Ci,PVi,K). The decrypted output KRi,j, the control value Cj, the public value PVj, and the random data key K are processed via combining function f6 at 633 to produce output f6(KRij,Cj,PVj,K). The two values f6(KRij,Ci,PVi,K) and f6(KRij,Cj,PVj,K) are then presented as outputs at output port 650 and appear on lines 651 and 652, respectively.

The serial data represented by f6(KRij,Ci,PVi,K) on line 651 is loaded into a shift register and read out in parallel to an output buffer. The output buffer is also loaded with a header and synchronizing data. The data in the output buffer is then read out serially and sent to using station i. In like manner, the serial data represented by f6(KRij,Cj,PVj,K) on line 652 is loaded into a shift register and read out in parallel to the output buffer. The output buffer is also loaded with a header and synchronizing data. The data in the output buffer is then read out serially and sent to using station j.

FIG. 22 shows an example of an embodiment of function f5 and a related function g5. By definition, these functions have three inputs and one output. In the case of f5, the inputs are KR, C and K. f5 comprises first and second encryption facilities. In the first encryption facility, K is encrypted under C to produce eC(K). This is in turn encrypted under KR in the second encryption facility to produce the eKR(eC(K))=f5(KR,C,K). In the case of g5, the inputs are C, KR and f5(KR,C,K)=Y. g5 comprises first and second decryption facilities. In the first decryption facility Y is decrypted under KR to produce dKR(Y). This is in turn decrypted under C in the second decryption facility to produce g5(KR,C,Y)=K.

FIG. 23 shows an example of an embodiment of function f6 and a related function g6. By definition, each has four inputs and one output. The inputs to f6 are KR, PV, C, and K. f6 comprises first, second and third encryption facilities. In the first encryption facility, K is encrypted under C to produce eC(K). This is in turn encrypted under PV in the second encryption facility to produce ePV(eC(K)). Finally, the output of the second encryption facility is encrypted under KR in the third encryption facility to produce f6(KR,C,PV,K)=Y. The inputs to g6 are C, PV, KR, and Y. g6 comprises first, second and third decryption facilities. In the first decryption facility, Y is decrypted under KR to produce dKR(Y). This is in turn decrypted under PV in the second decryption facility to produce dPV(dKR(Y)). Finally, the output of the second decryption facility is decrypted under C to produce the output g6(,KR,C,PV,Y)=K.

Figure 24A:
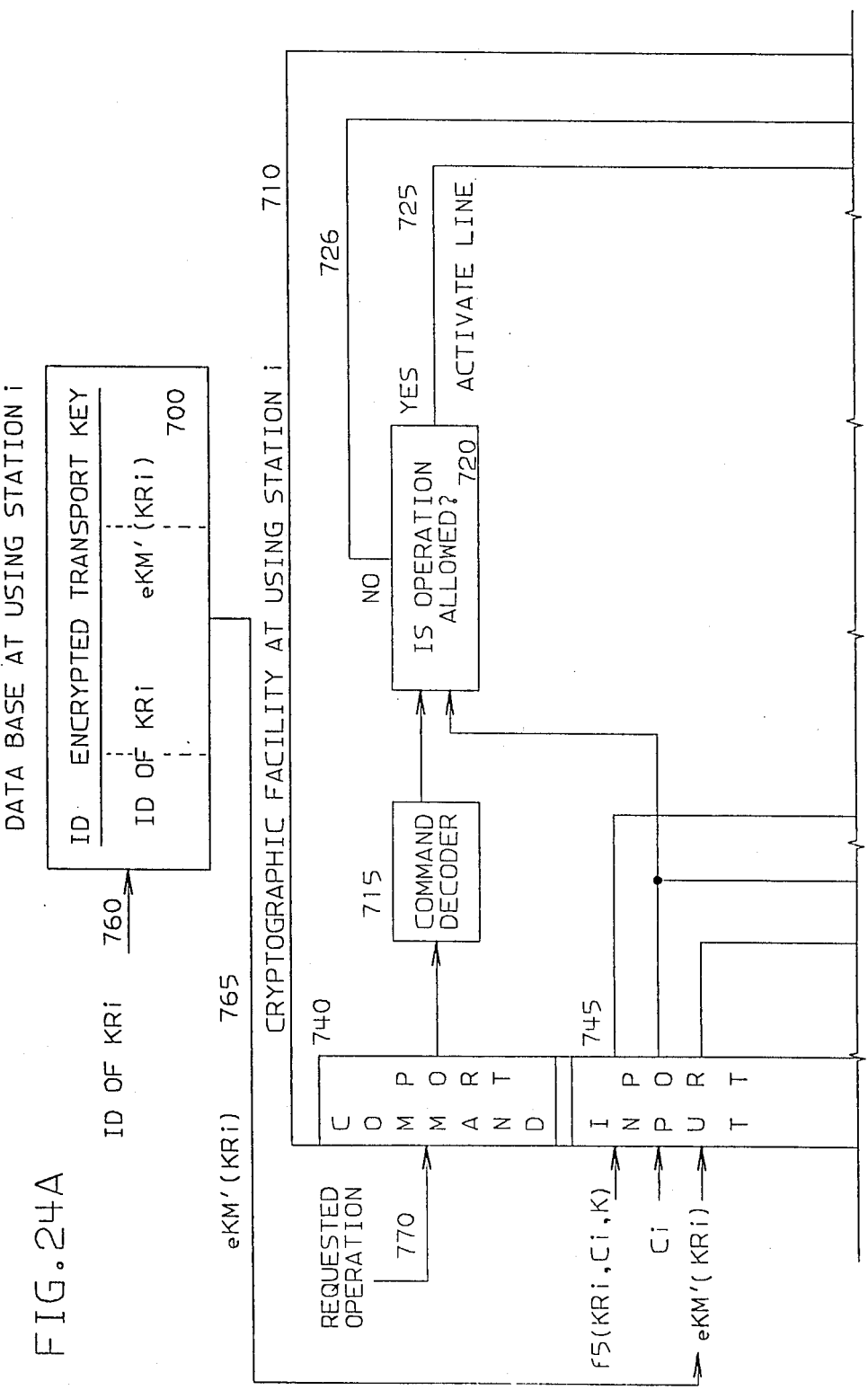
FIGS. 24A and 24B, taken together, are a block diagram of a third embodiment of a using station related to the third embodiment of the generating station shown in FIGS. 20A and 20B wherein the received key K is recovered via function g5, which is related to function f5.
Figure 24B:
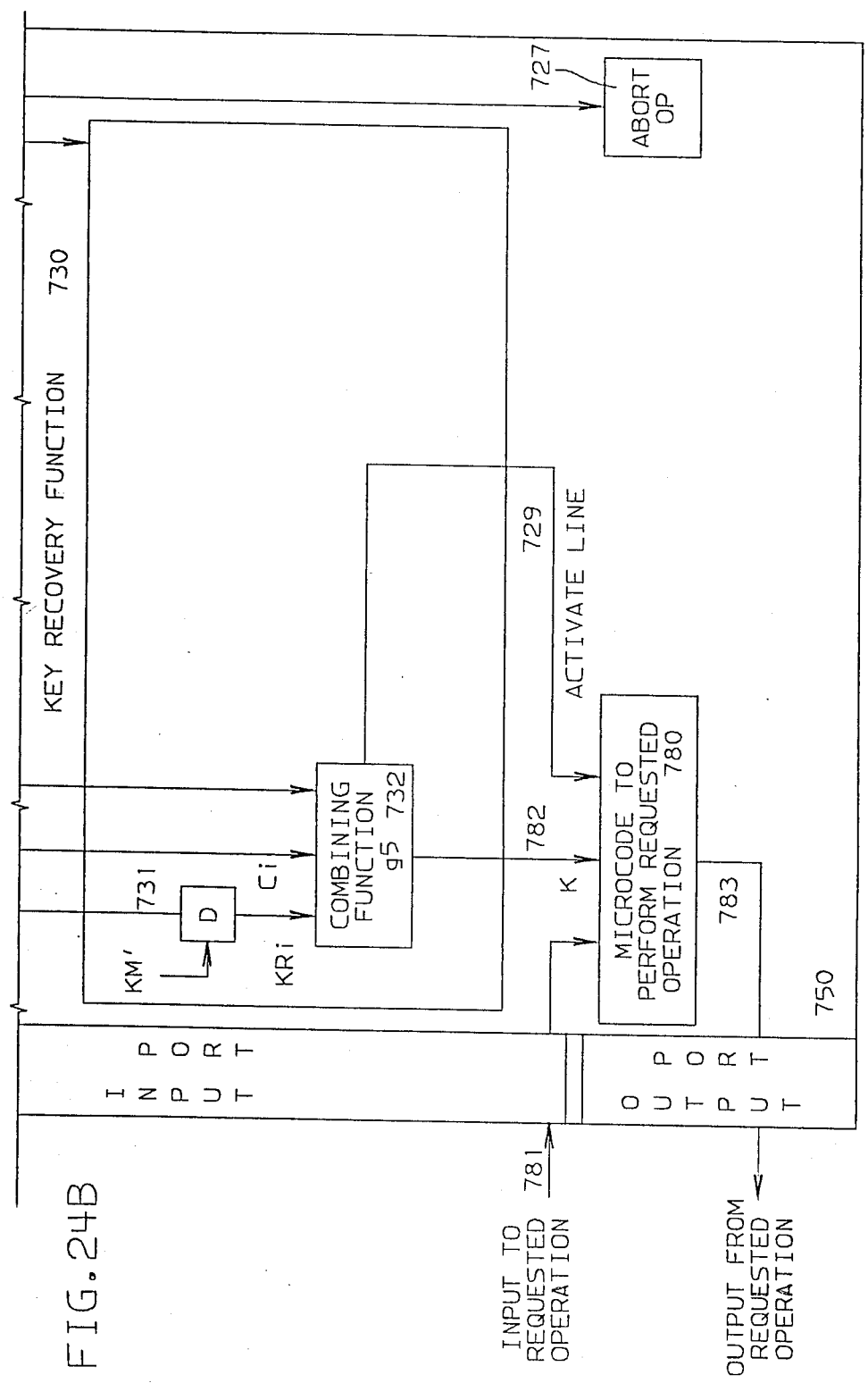

Referring now to FIGS. 24 and 24B, there is shown a third embodiment of a using station related to the third embodiment of the generating station shown in FIGS. 20A and 20B wherein the received key K is recovered via function g5, which is related to function g5. In FIG. 24, there is shown a data base 700 and a cryptographic facility 710 containing a command decoder 715, an "operation allowed" procedure 720, an "abort operation" procedure 727, a key recovery function 730, a command port 740, an input port 745, an output port 750, and microcode 780 to perform requested operation. Each using station i shares a unique secret transport key, KRi, with the generating station, which is used by the receiving station to receive encrypted data keys from the generating station. The transport keys shared with each station are encrypted under a prescribed variant of the master key of the receiving station, Km', and these encrypted transport keys are stored in data base 700. If there were only one generating station and one key shared with that generating station, then there would be only one encrypted transport key in data base 700. The encrypted transport keys in data base 700 are indexed by an identifier, here referred to as "ID of KR", which uniquely identifies each key in the list. Thus, in FIGS. 24A and 24B, "ID of KRi" refers to a particular KRi which using station i has shared with the generating station, and is the same KRi used by the generating station to communicate with using station i.

The using station also has a central processing unit (CPU) which manages and controls the key recovery and key usage process. The CPU receives a formatted message from the generating station, which contains the ID of the generating station, the IDi of the intended using station, the ID of KRi, a control value Ci, and a value f5(KRi,Ci,K). The CPU parses messages received from the generating station, extracts data parameters, accesses encrypted transport keys from its data base, and presents key and data parameters to the cryptographic facility in conjunction with requested cryptographic operations.

The steps involved in using a data key K at using station i can be traced in. The CPU first determines that a received data key K is to be used in a specified requested cryptographic operation. Using the received value of "ID of KRi", the encrypted transport key eKM'(KRi) is accessed from the data base 700 via line 760, and the encrypted key is read out on line 765. A requested operation on line 770 is input to command port 740 of the cryptographic facility 710. The encrypted transport key eKM'(KRi) accessed from data base 700, the control value Ci and the value f5(KRi,-Ci,K) from the received message, and other inputs necessary to the requested cryptographic operation but not received in the same message from the generating station, are presented as data inputs at input port 745. In response to the requested operation, the command decoder 715 activates the "operation allowed" procedure 720. Once enabled, the "operation allowed" procedure 720 will accept inputs f5(KRi,Ci,K), Ci and eKM'(KRi) from input port 745. These inputs are temporarily stored in the cryptographic facility 710. Using the just read value of Ci, the "operation allowed" procedure 720 determines whether the usage of data key K in the requested operation is authorized or granted on the basis of data in the control value Ci. If so, then the "operation allowed" procedure 720 produces an activate key recovery function on line 725, which enables the key recovery function 730. If not, then the "operation allowed" procedure 720 produces an activate abort operation on line 726. Once enabled, the abort operation 727 erases the inputs read from input port 745 and temporarily stored in the cryptographic facility 710 and enables another requested operation via command port 740. Once enabled, the key recovery function 730 will accept inputs f5(KRi,Ci,K), Ci and eKM'(KRi), which have been temporarily stored in the cryptographic facility.

The inputs are processed as follows. The value eKM'(KRi) is decrypted at 731 under master key variant KM'. KM' is a dynamically generated variant of the master key, KM, where KM is stored in the key and parameter storage of the cryptographic facility 710, as shown in FIG. 2, and is available for use by the key recovery function 730. The decrypted output KRi and the input values of Ci and f5(KRi,Ci,K) are processed via combining function g5 at 732 to produce output data key K. The successful completion of the combining function g5 also raises an activate operation on line 729, which enables the microcode that performs the requested operation. Once enabled, the microcode to perform requested operation 780 will accept input to requested operation on line 781 via input port 745 and the so-processed data key K on line 782, which is output from combining function g5 at 732. The requested operation is then performed at 780 using these key and data inputs. The output of the requested operation 780 is then presented at output port 750 and appears on line 783.

Figure 25A:
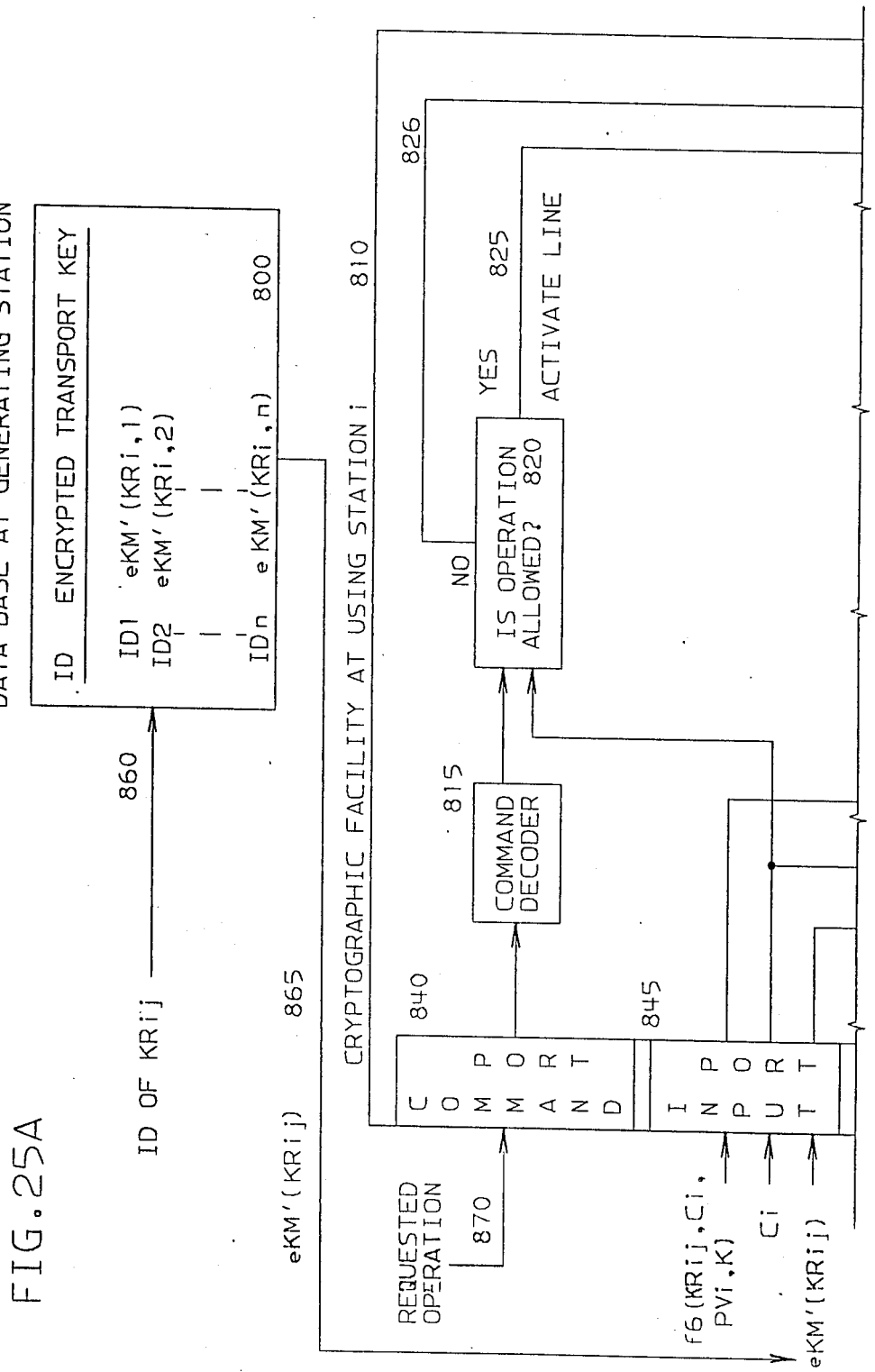
FIGS. 25A and 25B, taken together, are a block diagram of a fourth embodiment of a using station related to the fourth embodiment of the, generating station shown in FIGS. 21A and 21B wherein the received key K is recovered via function g6, which is related to function f6.
Figure 25B:
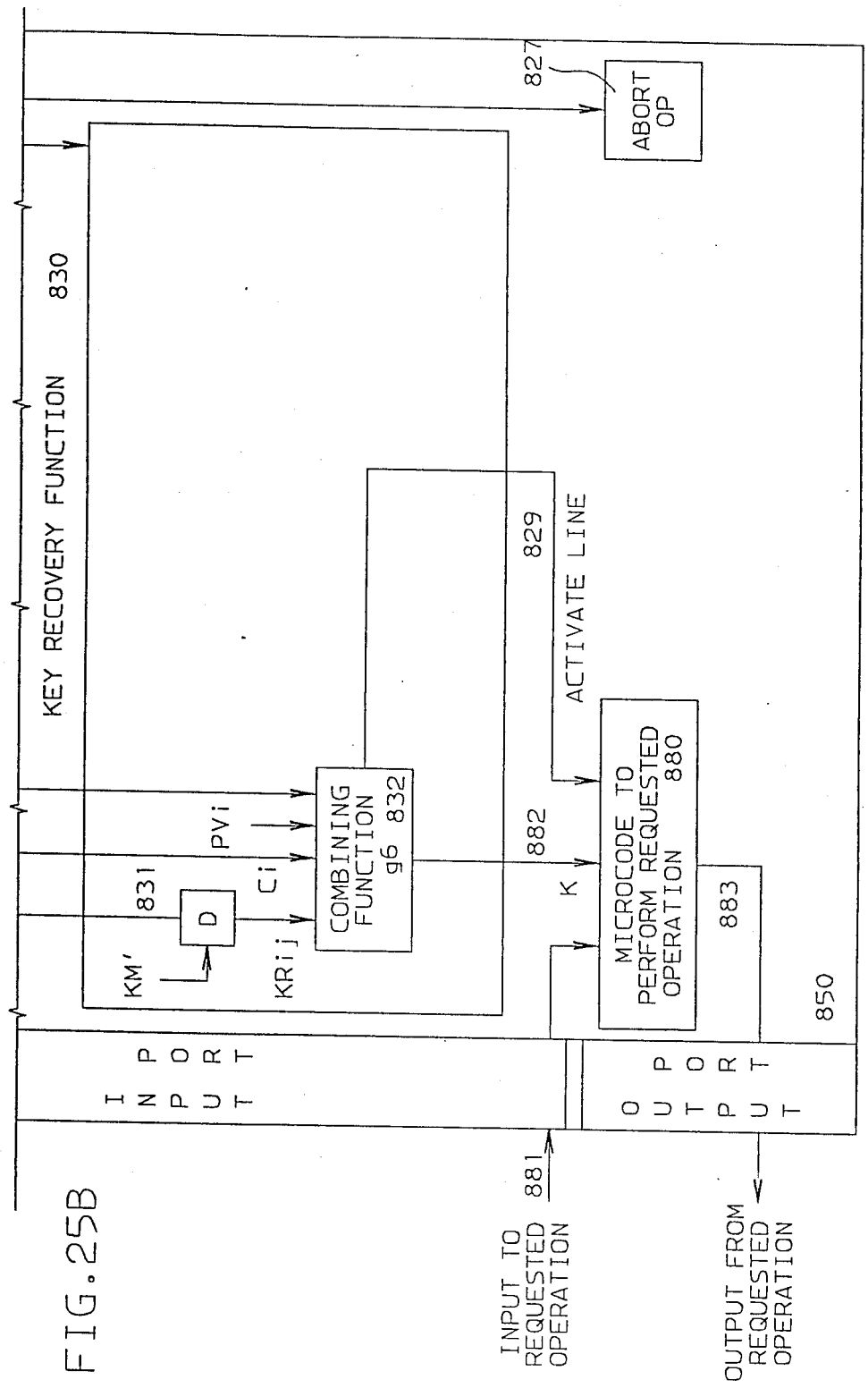

Referring now to FIGS. 25A and 25B, there is shown a fourth embodiment of a using station related to the fourth embodiment of the generating station shown in FIGS. 21A and 21B wherein the received key K is recovered via function g6 which is related to function f6. In FIGS. 25A and 25B, there is shown a data base 800 and a cryptographic facility 810 containing a command decoder 815, an "operation allowed" procedure 820, an "abort operation" procedure 827, a key recovery function 830, a command port 840, an input port 845, an output port 850, and microcode 870 to perform requested operation. Each pair of using stations i and j share a unique secret transport key, KRij, which is also shared with the generating station. The transport key KRij is used by using station i to recover or regenerate data keys from information received from a generating station, where the so-recovered or so-regenerated data keys will be used for communication with using station j, and vice versa. The transport keys shared in common with each other using station, and also with the generating station, are encrypted under a prescribed variant of the master key of the receiving station, KM', and these encrypted transport keys are stored in data base 800. The encrypted transport keys in data base 800 are indexed by an identifier which uniquely relates the key to using station j. Thus, in FIG. 25, the term "ID of KRij" is the identifier of KRij, which is the transport key that using station i shares with using station j.

The using station also has a central processing unit (CPU) which manages and controls the key recovery and key usage process. The CPU receives a formatted message from the generating station, which contains the ID of the generating station, the IDi of the intended using station, the ID of KRij, a control value Ci, and a value f6(KRij,Ci,Pi,K). The CPU parses messages received from the generating station, extracts data parameters, accesses encrypted transport keys from its data base, and presents key and data parameters to the cryptographic facility in conjunction with requested cryptographic operations.

The steps involved in using a data key K at using station i can be traced in FIG. 25. The CPU first determines that a received data key K is to be used in a specific requested cryptographic operation. Using the received value of "ID of KRij", the encrypted transport key eKM'(KRij) is accessed from the data base 800 via line 860, and the encrypted key is read out on line 865. A requested operation on line 870 is input to command port 840 of the cryptographic facility 810. The encrypted transport key eKM'(KRij) accessed from data base 800, the value f6(KRij,Ci,PVi,K) and control value Ci extracted from the received message, and other inputs necessary to the requested cryptographic operation but not received in the same message from the generating station, are presented as data inputs at input port 845. In response to the requested operation, the command decoder 815 activates the "operation allowed" procedure 820. Once enabled, the "operation allowed" procedure 820 will accept inputs f6(KRij,Ci,PVi,K), Ci, and eKM'(KRij) from input port 845. These inputs are temporarily stored in the cryptographic facility 810. Using the just read value of Ci, the "operation allowed" procedure 820 determines whether the usage of data key K in the requested operation is authorized or granted on the basis of data in the control value Ci. If so, then the "operation allowed" procedure 820 produces an activate key recovery function on line 825, which enables the key recovery function 830. If not, then the "operation allowed" procedure 820 produces an activate abort operation on line 826. Once enabled, the abort operation 827 erases the inputs read from input port 845 and temporarily stored in the cryptographic facility 810 and enables another requested operation via command port 840. Once enabled, the key recovery function 830 will accept inputs f6(KRij,Ci,PVi,K), Ci and eKM'(KRij), which have been temporarily stored in cryptographic facility 810.

The inputs are processed as follows. The value eKM'(KRij) is decrypted at 831 under master key variant KM'. KM' is a dynamically generated variant of the master key, KM, where KM is stored in the key and parameter storage of the cryptographic facility 810, as shown in FIG. 2, and is available for use by the key recovery function 830. The decrypted output KRij, the input value Ci, the value PVi, and the input value f6(KRi,j,Ci,PVi,K) are processed via combining function g6 at 832 to produce output data key K. The public value PVi associated with using station i is stored in the key and parameter storage of the cryptographic facility 810, as shown in FIG. 2, and is available for use by the key recovery function 830. The successful completion of the combining function g6 also raises an activate operation on line 829, which enables the microcode that performs the requested operation. Once enabled, the microcode 880 to perform the requested operation will accept input to requested operation on line 881 via input port 845 and the so-produced data key K on line 882, which is the output from combining function g6 at 832. The requested operation is then performed at 880 using these key and data inputs. The output of the requested operation 880 is then presented at output port 850 and appears on line 883.

At a using station we have shown the recovery and controlled use of a single data key. However, the invention could be enlarged to provide for the simultaneous recovery and controlled use of any number of any type of keys at each using station. The public values PV1 . . . PVn could be the IDs or functions of the IDs of the respective using stations, in which case the two data bases would be combined. The public values could also be public keys in an RSA algorithm type system or could simply be random numbers. The control value may, under certain protocols, reside at the using station so that it would not be necessary to transmit the control value to the designated using stations. For example, a using station may send with its request for a cryptographic key from the generating station an appropriate or specified control value.

FIG. 26 illustrates but one possible control vector which may be used in the practice of the present invention. The control vector may be viewed as a bit map of one dimension which represents the control value used in any of the several embodiments of the invention described above. From left to right in FIG. 26, the first and second bits may be ones or zeros to control whether the cryptographic key can be used to encipher or decipher or both encipher and decipher data. Following the first two bits is an initial chaining value (ICV) which, under the DES algorithm, controls the mode of block chaining used in the process. The values for the ICV are shown in FIG. 26 and they are mutually exclusive. Next, are two bits which control whether the cryptographic key can be used for message authentication code generation (MACGEN) or verification (MACVER). Following that is an ICV for the message authentication code. Next are two bits which control the translation of cipher text to or from another form. This is followed by an ICV for the translation of cipher text. Finally, there are two bits which control the translation of a personal identification number (PIN).

CONCLUSION

To summarize, the sender, by specifying how a particular key should be handled at the receiver, via the control block C, determines key management operations at the receiver. Consequently, exposures at the receiver are minimized, provided that the integrity of the cryptographic operations are assured, e.g., via a cryptographic facility.

While the invention has been described in terms of a specific preferred embodiment, those skilled in the art will recognize that the invention can be practiced with modification within the spirit and scope of the appended claims.

Having thus described our invention, what we claim as new and desire to secure by Letters Patent is as follows:

1. A method for controlling the use of a cryptographic key at a using station by a generating station in a network of generating and using stations by transmitting said cryptographic key with a control value specifying the use of said cryptographic key from the generating station which generates the cryptographic key to at least two designated using stations one of which may be the generating station, each of said generating and using stations having a cryptographic facility which securely stores a master key, said method comprising the steps of:

storing in a data base at a generating station a plurality of encrypted secret transport keys unique to each of said using stations and indexed by identifications of said using stations, said encrypted secret transport keys being encrypted under a variant of said master key;

generating a command for the generation and distribution of a cryptographic key with a controlled use to at least two designated using stations in said network; and in response to said command, generating a random key in said cryptographic facility of the generating station as said cryptographic key;

accessing the encrypted secret transport keys for the designated using stations using the identification for the using stations;

decrypting in said cryptographic facility of the generating station the accessed secret transport keys for the designated using stations using said variant of said master key;

combining in said cryptographic facility of the generating station the decrypted secret transport keys with the generated cryptographic key to produce a combined function $f_1$ for each designated using station;

reading a control value for said cryptographic key for each said designated using station;

combining in said cryptographic facility of the generating station the generated cryptographic key with said control value for each said designated using station to produce a combined function $f_2$;

transmitting said combined functions $f_1$ and $f_2$ for each said designated using station to the corresponding designated using stations;

storing said encrypted secret transport key at a designated using station indexed by the identification of said using station;

requesting a cryptographic operation requiring the use of the cryptographic key generated by said generating station in combination with a control value;

accessing said encrypted secret transport key and temporarily storing in the cryptographic facility of said designated using station said encrypted secret transport key together with said control value and said combined functions $f_1$ and $f_2$ transmitted from said generating station; and determining if said requested cryptographic operation at said designated using station is permitted.

2. The method recited in claim 1 wherein the step of combining to produce the combined function $f_1$ is performed by encrypting said generated cryptographic key under the decrypted secret transport keys for each designated using station, and wherein the step of combining to produce the combined function $f_2$ is performed by first encrypting the control values for each said designated using station under said generated cryptographic key and then exclusive ORing the thus encrypted control values with the control values for each said designated using station.

3. The method recited in claim 1 further comprising transmitting said control value for each said designated using station to the corresponding designated using stations.

4. The method recited in claim 3 further comprising at a designated using station the steps of:

checking in the cryptographic facility of the using station said control value to determine if the requested operation is allowed by said control value;

if the requested operation is allowed, then in the cryptographic facility of the using station decrypting said encrypted secret transport key stored in said cryptographic facility using a variant of said master key, combining the decrypted secret transport key with said combined function $f_1$ using a combining function $g_1$ to recover said generated cryptographic key, combining the recovered cryptographic key with said control value to produce an authentication function $f_2$, comparing the temporarily stored combined function $f_2$ with said authenticating function $f_2$, and if said stored combined function $f_2$ and said authenticating function $f_2$ are equal, enabling said requested cryptographic operation; otherwise, aborting the requested cryptographic operation and erasing the temporarily stored values in the cryptographic facility of said using station.

5. The method recited in claim 4 wherein said combining function $g_1$ is an inverse function of said function $f_1$.

6. A method for controlling the use of a cryptographic key at a using station by a generating station in a network of generating and using stations by transmitting said cryptographic key with a control value specifying the use of said cryptographic key from the generating station which generates the cryptographic key to at least two designated using stations one of which may be the generating station, each of said generating and using stations having a cryptographic facility which securely stores a master key and a nonsecret value unique to each using station, said method at a generating station comprising the steps of:

storing in a first data base a plurality of encrypted secret transport keys unique to each pair of using stations in said network and indexed by identifications of pairs of using stations sharing a secret transport key, said encrypted secret transport keys being encrypted under a variant of said master key;

storing in a second data base a plurality of nonsecret values unique to each using station in said network and indexed by identifications of said using stations;

generating a command for the generation and distribution of a cryptographic key with a controlled use to at least two designated using stations in said network; and in response to said command, generating a random number in said cryptographic facility;

accessing the encrypted secret transport keys shared by designated using stations using the identifications for the using station pairs sharing the encrypted secret transport keys;

accessing the nonsecret values for the designated using stations using the identifications for the designated using stations;

decrypting in said cryptographic facility of the generating station the accessed secret transport keys using said variant of said master key;

combining in said cryptographic facility of the generating station the generated random number with the decrypted secret transport keys to produce a combined function f for each of the designated using stations;

combining in said cryptographic facility of the generating station the decrypted secret transport key with said combined function $f_3$ to generate said cryptographic key;

reading a control value for said cryptographic key for each said designated using station;

for each said designated using station, combining the generated cryptographic key with the control value and the nonsecret value for the designated using station to produce a combined function $f_4$ for the designated using station; and transmitting said combined functions $f_3$ and $f_4$ for each said designated using station to the corresponding designated using stations.

7. The method recited in claim 6 further comprising transmitting said control value for each said designated using station to the corresponding designated using stations.

8. The method recited in claim 7 wherein the step of combining to produce the combined function $f_3$ is performed by encrypting said random number under said decrypted secret transport key for each of the designated using stations.

9. The method recited in claim 7 wherein the step of combining to produce the combined function $f_4$ is performed by first encrypting said control values under said generated cryptographic key and then exclusive ORing the thus encrypted control values with said nonsecret values for each of said designated using stations.

10. The method recited in claim 7 further comprising at a designated using station the steps of:

storing in a data base said encrypted secret transport key indexed by the identification of the using station pair sharing the secret transport key;

storing said nonsecret value for the designated using station in the cryptographic facility of the designated using station;

requesting a cryptographic operation requiring the use of the cryptographic key generated by said generating station in combination with a control value;

accessing said encrypted secret transport key and temporarily storing in the cryptographic facility of said designated using station said encrypted secret transport key together with said control value and the combined functions $f_3$ and $f_4$ transmitted from said generating station;

checking said control value to determine if the requested operation is allowed by said control value;

if the requested operation is allowed, then in the cryptographic facility of the designated using station decrypting said encrypted secret transport key stored in said cryptographic facility of the designated using station using a variant of said master key, combining the decrypted secret transport key with said combined function $f_3$ using a combining function $g_3$ to recover said generated cryptographic key, combining the recovered cryptographic key with said control value and the nonsecret value for the designated using station to produce an authentication function $f_4$, comparing the temporarily stored combined function $f_4$ with the authenticating function $f_4$, and if said stored combined function $f_4$ and said authenticating function $f_4$ are equal, enabling said requested cryptographic operation; otherwise, aborting the requested cryptographic operation and erasing the temporarily stored values in said cryptographic facility.

11. The method recited in claim 10 wherein the step of combining to produce the combined function $f_3$ is performed by making said combined function $f_3$ equal to said random number and wherein said combining function $g_3$ includes the steps of encrypting said random number under said decrypted secret transport key and then exclusive ORing the encrypted random number with the random number.

12. The method recited in claim 10 wherein said combining function $g_3$ is an inverse function of said function $f_3$.

13. A method for controlling the use of a cryptographic key at a using station by a generating station in a network of generating and using stations by transmitting said cryptographic key with a control value specifying the use of said cryptographic key from the generating station which generates the cryptographic key to at least two designated using stations one of which may be the generating station, each of said generating and using stations having a cryptographic facility which securely stores a master key, said method at a generating station comprising the steps of:

storing in a data base a plurality of encrypted secret transport keys unique to each of said using stations and indexed by indentifications of said using stations, said incrypted secret transport keys being encrypted under a variant of said master key;

generating a command for the generation and distribution of a cryptographic key with a controlled use to at least two designated using stations in said network; and in response to said command, generating a random key in said cryptographic facility as said cryptographic key;

accessing the encrypted secret transport keys for the designated using stations using the identification for the using stations;

decrypting in said cryptographic facility of the generating station the accessed secret transport keys for the designated using stations using said variant of said master key;

reading a control value for said cryptographic key for each said designated using station;

combining in said cryptographic facility of the generating station the decrypted secret transport keys with the generated cryptographic key and the control value for each designated using station to produce a first combined function for each designated using station; and transmitting said combined function for each said designated using station to the corresponding designated using stations.

14. The method recited in claim 13 further comprising the step of transmitting said control value for each said designated using station to the corresponding designated using stations.

15. The method recited in claim 14 wherein the step of combining to produce the first combined function $f_5$ for each designated using station is performed by encrypting said generated cryptographic key under the control value for the corresponding designated using station to produce a first encrypted value and then encrypting said first encrypted value the decrypted secret transport key for the corresponding designated using station.

16. The method recited in claim 14 further comprising at a designated using station the steps of:

storing said encrypted secret transport key indexed by the identification of said using station;

requesting a cryptographic operation requiring the use of the cryptographic key generated by said generating station in combination with a control value;

accessing said encrypted secret transport key and temporarily storing in the cryptographic facility of said designated using station said encrypted secret transport keys together with said control value and said first combined function transmitted from said generating station;

checking said control value to determine if the requested operation is allowed by said control value;

if the requested operation is allowed, then in the cryptographic facility of said designated using station decrypting said encrypted secret transport key stored in said cryptographic facility using a variant of said master key, combining the decrypted secret transport key with said first combined function and said control value using a second combining function to recover said generated cryptographic key, and enabling said requested cryptographic operation; otherwise, aborting the requested cryptographic operation and erasing the temporarily stored values in said cryptographic facility.

17. The method recited in claim 16 wherein said second combining function is an inverse function of said first combined function.

18. A method for controlling the use of a cryptographic key at a using station by a generating station in a network of generating and using stations by transmitting said cryptographic key with a control value specifying the use of said cryptographic key from the generating station which generates the cryptographic key to at least two designated using stations one of which may be the generating station, each of said generating and using stations having a cryptographic facility which securely stores a master key and a nonsecret value for each of said using stations, said method at a generating station comprising the steps of:

storing in a first data base a plurality of encrypted secret transport keys unique to each pair of using stations in said network and indexed by identifications of pairs of using stations sharing a secret transport key, said encrypted secret transport keys being encrypted under a variant of said master key;

storing in a second data base a plurality of nonsecret values unique to each using station in said network and indexed by identifications of said using stations;

generating a command for the generation and distribution of a cryptographic key with a controlled use to at least two designated using stations in said network; and in response to said command, generating a random key in said cryptographic facility as said cryptographic key;

accessing the encrypted secret transport keys shared by designated using stations using the identifications for the using station pairs sharing the encrypted secret transport keys;

accessing the nonsecret values for the designated using stations using the identifications for the designated using stations;

decrypting in said cryptographic facility of the generating station the accessed secret transport keys using said variant of said master key;

reading a control value for said cryptographic key for each said designated using station;

combining in said cryptographic facility of the generating station the generated cryptographic key with the decrypted secret transport key, control value and nonsecret value for each designated using station to produce a combined function $f_6$ for each of the designated using stations; and transmitting said combined function $f_6$ for each said designated using station to the corresponding designated using stations.

19. The method recited in claim 18 further comprising transmitting said control value for each said designated using station to the corresponding designated using stations.

20. The method recited in claim 19 wherein the step of combining to produce the combined function $f_6$ is performed by encrypting said cryptographic key under said control value for the designated using station to produce a first encrypted value, encrypting said first encrypted value under said nonsecret value for the designated using station to produce a second encrypted value, and encrypting said second encrypted value under said decrypted secret transport key for the designated using station.

21. The method recited in claim 19 further comprising at a designated using station the steps of:

storing in a data base said encrypted secret transport key indexed by the identification of the using station pair sharing the secret transport key;

storing said nonsecret value for the designated using station in the cryptographic facility of the designated using station;

requesting a cryptographic operation requiring the use of the cryptographic key generated by said generating station in combination with a control value;

accessing said encrypted secret transport key and said nonsecret value and temporarily storing in the cryptographic facility of said designated using station said encrypted secret transport key together with said control value and combined function $f_6$ transmitted from said generating station;

checking said control value to determine if the requested operation is allowed by said control value;

if the requested operation is allowed, then decrypting said encrypted secret transport key stored in said cryptographic facility using a variant of said master key, combining the decrypted secret transport key with said control value, said nonsecret value and said combined function $f_6$ using a combining function $g_6$ to recover said generated cryptographic key, and enabling said requested cryptographic operation; otherwise, aborting the requested cryptographic operation and erasing the temporarily stored values in said cryptographic facility.

22. The method recited in claim 21 wherein said combining function $g_6$ is an inverse function of said function $f_6$.

* * * * *